United States Patent

Murata et al.

[11] Patent Number: 5,992,361
[45] Date of Patent: *Nov. 30, 1999

[54] VARIABLE VALVE TIMING MECHANISM

[75] Inventors: Shinichi Murata, Okazaki; Akihiro Fujimoto, Nagoya; Jun Isomoto, Chiryu, all of Japan

[73] Assignee: Mitsubishi Jidosha Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/053,657

[22] Filed: Apr. 2, 1998

[30] Foreign Application Priority Data

Apr. 2, 1997 [JP] Japan ................................. 9-084213

[51] Int. Cl.$^6$ ........................................... F01L 13/00
[52] U.S. Cl. .................................... 123/90.17; 123/90.15
[58] Field of Search ............................. 123/90.15, 90.17, 123/90.31, 90.6; 74/568 R

[56] References Cited

U.S. PATENT DOCUMENTS

| 5,622,144 | 4/1997 | Nakamura et al. | 123/90.17 |
| 5,636,603 | 6/1997 | Nakamura et al. | 123/90.17 |
| 5,645,020 | 7/1997 | Yamada | 123/90.17 |
| 5,687,681 | 11/1997 | Hara | 123/90.17 |
| 5,709,179 | 1/1998 | Hara et al. | 123/90.17 |

FOREIGN PATENT DOCUMENTS

| 47-20654 | 6/1972 | Japan . |
| 3-168309 | 7/1991 | Japan . |
| 4-183905 | 6/1992 | Japan . |
| 6-10630 | 1/1994 | Japan . |

Primary Examiner—Weilun Lo

[57] ABSTRACT

In a variable timing mechanism, valve lifting characteristics are changed to meet the engine power output characteristics when the timing of valve operation is changed. The variable timing mechanism is provided for the side of at least one of an intake and an exhaust valve so that, when a running condition of an internal combustion engine is changed from a low engine speed to a high engine speed, a duration of valve opening of at least one of the intake and the exhaust valve is changed to increase an overlap period of the intake and the exhaust valve at the beginning of the changes in the running condition of the engine.

2 Claims, 17 Drawing Sheets

FULL LIFT STROKE

① VARIATION IN ANGULAR VELOCITY OF INTERMEDIATE ROTARY MEMBER RELATIVE TO CAMSHAFT

② VARIATION IN ANGULAR VELOCITY OF CAM LOBE RELATIVE TO INTERMEDIATE ROTARY MEMBER
FIG. 6(B1)
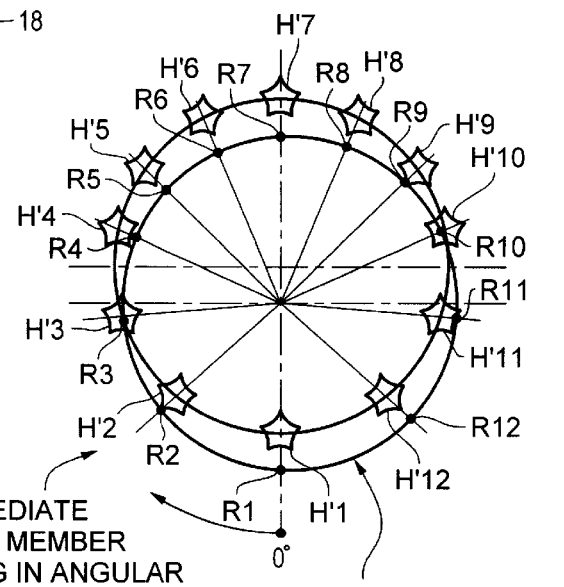
Ⓑ RADIAL GUIDE GROOVE 16B OPPOSITELY DISPOSED IN DIAMETER FROM RADIAL GUIDE GROOVE 16A
FIG. 6(B2)
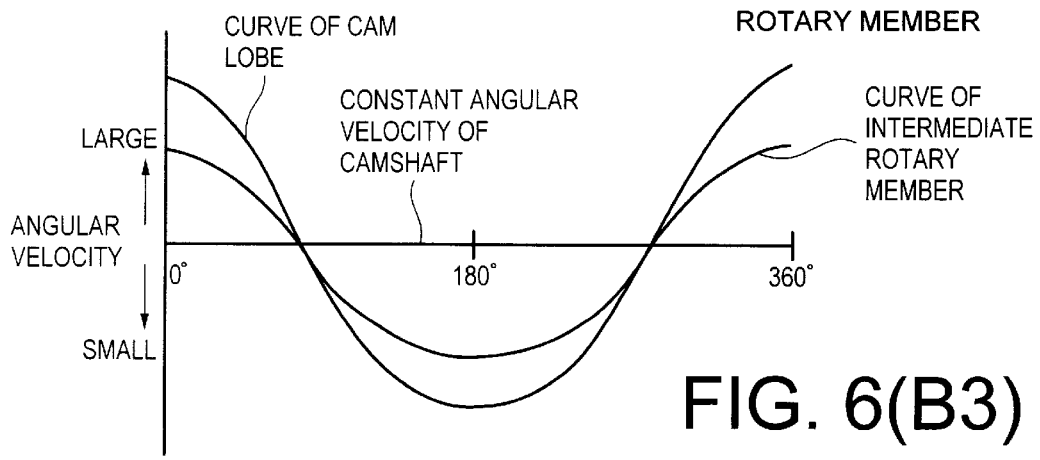
FIG. 6(B3)

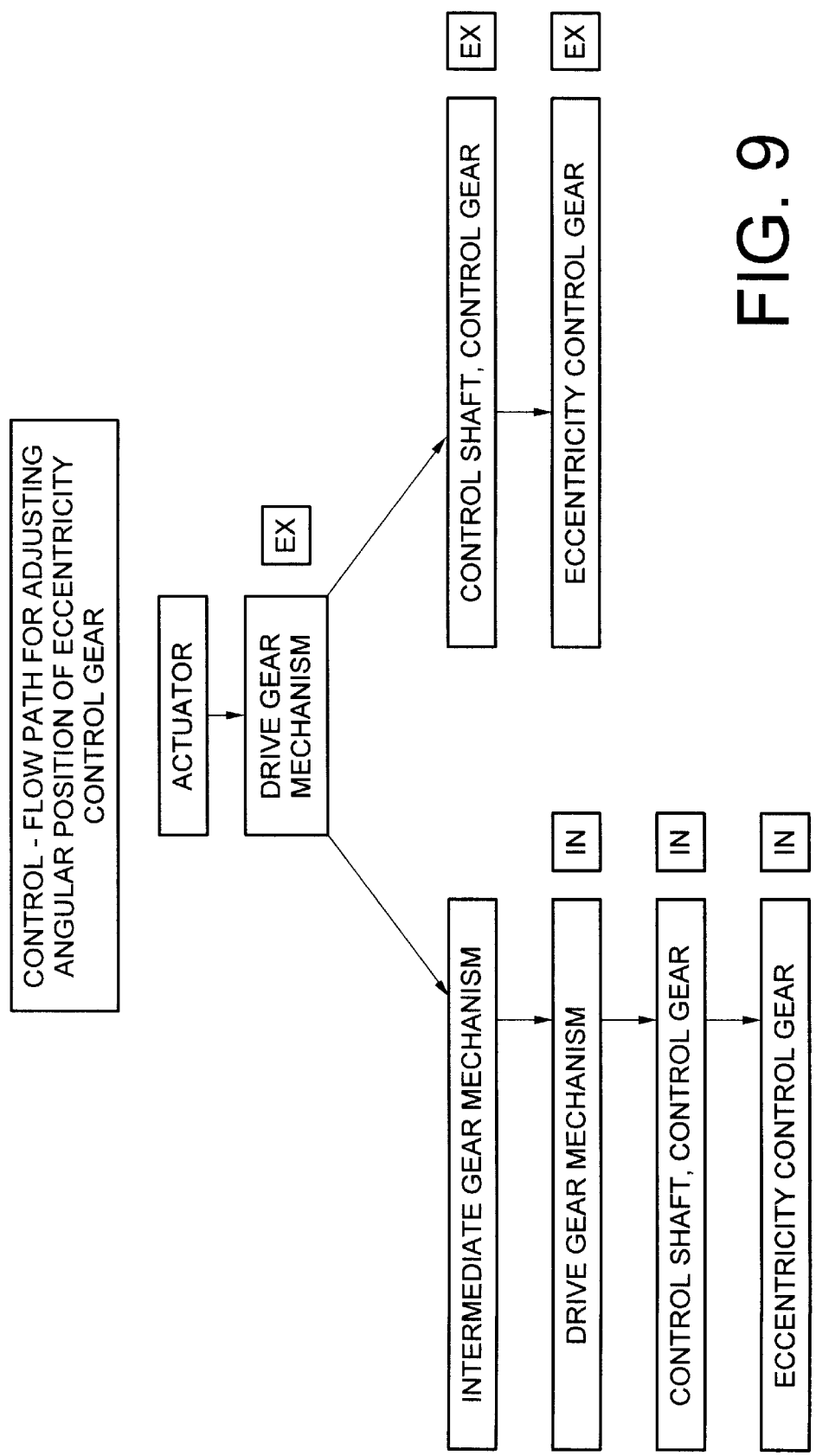

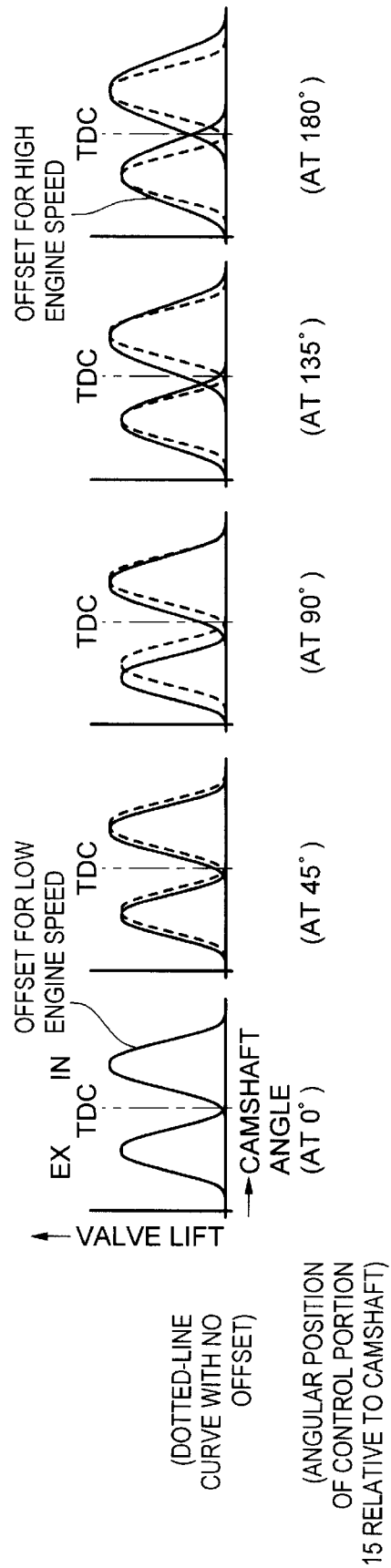

(SAME DIRECTION OF ROTATION IN GEARS)

DIRECTION OF CRANKSHAFT ROTATION (SAME DIRECTION OF ROTATION IN GEARS)

DIRECTION OF CRANKSHAFT ROTATION

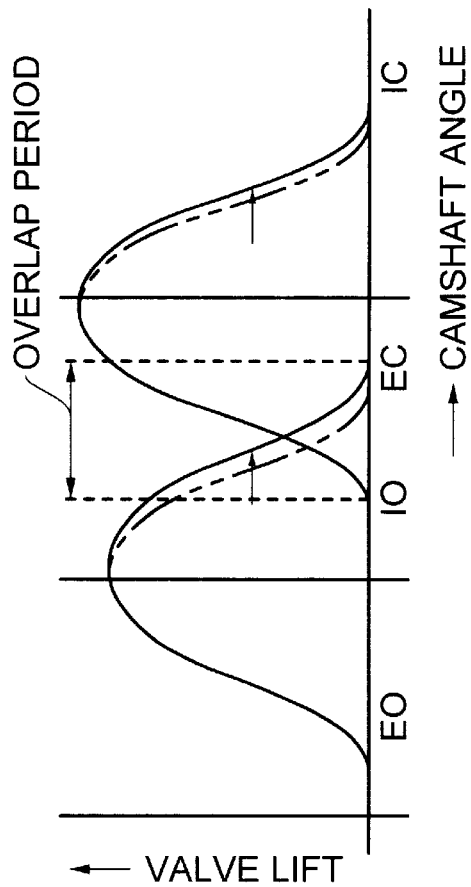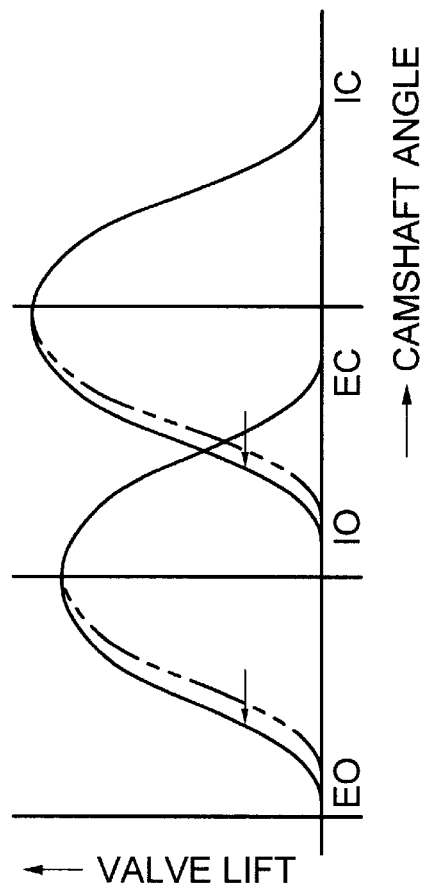
FIG. 13(c)
FIG. 13(d)

VARIABLE VALVE TIMING MECHANISM

BACKGROUND OF THE INVENTION

1. Field of the Invention:

The present invention relates to a variable valve timing mechanism for controlling the valve timing of at least one of an intake and an exhaust valve in a manner such that the valve has its opening and closing operation timed to a running condition of an internal combustion engine, and more particularly to the variable valve timing mechanism in which a non-constant velocity joint is used to convert a constant input angular velocity into a variable output angular velocity while the joint makes one turn.

2. Description of Related Art:

A reciprocating internal combustion engine (hereinafter referred to as the engine) is provided with an intake and an exhaust valve (hereinafter referred to, as a general term, as the "engine valve", or simply as the "valve"). Since the valve is driven in a condition in which its lift depends on a cam shape and a current phase angle (i.e., current angular position) of the cam in rotation relative to a fixed reference angular position of the cam, both a timing of each of a valve opening and a valve closing operation of the valve and the duration of valve opening of the valve also depend on the cam shape and the current angular position of the cam in rotation, provided that the duration of the valve opening is a period of time for which the valve is kept open, the duration being expressed numerically in crankshaft angle.

On the other hand, as for the intake and the exhaust valve both provided in the engine, the optimum timing of each of the valve opening and the valve closing operation and also the optimum duration of the valve opening vary in response to a current engine load and engine speed. Consequently, in order to control the timing and the duration of valve opening, various types of a so-called variable valve timing apparatus or mechanism have been proposed.

In addition to these proposed types, an additional and noted one has been also developed, in which one: a non-constant velocity joint with an eccentric mechanism is interposed between a cam and a camshaft; they (i.e., the cam and the camshaft) are parallel to but radially offset from each other, so that the cam has its axis of rotation be eccentric to that of the camshaft, which enables the cam to vary its angular velocity when the camshaft makes one turn at a constant angular velocity; consequently, it is possible for this noted one to adjust the timing and the duration of each of the valve opening and the valve closing by adjusting an amount of eccentricity of the axis of rotation in the cam of the eccentric mechanism.

Use of such non-constant velocity joint is disclosed in, for example: Japanese Patent Publication No. Sho 47-20654; Japanese Patent Laid-Open Nos. Hei 3-168309, Hei 4-183905, Hei 6-10630 and the like.

In the variable valve timing mechanism using such non-constant velocity joint, the pattern in which the timing of each of the intake and the exhaust valve varies depends on a direction of rotation, in which direction the eccentric machanism is adjusted in its eccentricity. This pattern affects the engine power output characteristics.

Consequently, there is the need for adjusting a current angular position of the eccentric mechanism in a rotational direction suitable for the engine power output characteristics.

SUMMARY OF THE INVENTION

Under such circumstances, the present invention was made. Consequently, it is an object of the present invention to provide a variable valve timing mechanism, which is capable of changing the valve lifting characteristics to meet the engine power output characteristics when its eccentric mechanism adjusts the timing of valve operation.

In accordance with a first aspect of the present invention, the above object is accomplished by providing:

A variable valve timing mechanism comprising:

a camshaft to which torque is transmitted from a crankshaft of an internal combustion engine;

a cam lobe rotatably mounted on the camshaft, the cam lobe being provided with a cam portion for driving at least one of an intake valve and an exhaust valve of the internal combustion engine;

a control mechanism for varying the duration of valve opening of the valve by changing an angular position of the cam lobe relative to the camshaft in response to a running condition of the internal combustion engine, the control mechanism being interposed between the camshaft and the cam lobe;

the variable valve timing mechanism being disposed in the side of at least one of the intake valve and the exhaust valve; and the variable valve timing mechanism being so set as to vary a valve opening duration of at least one of the intake and the exhaust valve in a manner such that, when the running condition of the internal combustion engine changes from a low engine speed to a high engine speed, an overlap period of the intake and the exhaust valve increases at the beginning of such change in the running condition of the internal combustion engine.

In the variable valve timing mechanism of the present invention having the above construction, when the running condition of the internal combustion engine is changed from a low engine speed to a high engine speed, since the variable valve timing mechanism is so set as to vary the duration of valve opening of at least one of the intake and the exhaust valve in a manner such that the overlap period of the intake and the exhaust valve increases at the beginning of such change in the running condition of the internal combustion engine, an advantage is found in that smooth engine torque characteristics are obtained when the valve timing is changed. In other words, during such transition period from the low engine speed to the high engine speed, it is possible to effectively eliminate any stepped portions in an engine torque curve by increasing the overlap period of the intake and the exhaust valve, which realizes a smooth acceleration in engine speed. Further, another advantage is also found in that a peak value of the engine torque curve in a range of intermediate engine speeds increases.

Further, in accordance with a second aspect of the present invention, the above object of the present invention is accomplished by providing:

The variable valve timing mechanism as set forth in the first aspect of the present invention, wherein:

the variable valve timing mechanism is disposed in the side of each of the intake and the exhaust valve; and the variable valve timing mechanism is set in a manner such that, when the running condition of the internal combustion engine changes from a low engine speed to a high engine speed, as a first step the timing of valve opening is advanced in the intake valve, while the timing of valve closure is retarded in the exhaust valve, and then, as a second step the timing of valve closure is retarded in the intake valve, while the timing of valve opening is advanced in the exhaust valve.

As described above, in the above construction, the timing of valve operation is set in a manner such that, when the running condition of the internal combustion engine changes from a low engine speed to a high engine speed, as a first step the timing of valve opening is advanced in the intake valve, while the timing of valve closure is retarded in the exhaust valve, and then, as a second step the timing of valve closure is retarded in the intake valve, while the timing of valve opening is advanced in the exhaust valve. Consequently, an advantage is found in that the overlap period of the intake and the exhaust valve is further increased, which further facilitates elimination of stepped portions of the engine torque curve.

Further, in accordance with a third aspect of the present invention, the above object of the present invention is accomplished by providing:

The variable valve timing mechanism as set forth in the second aspect of the present invention, wherein the variable valve timing mechanism is disposed in at least the side of the intake valve, and the control mechanism comprises:

a control disc provided with an eccentric portion an axis of which is parallel to an axis of the camshaft;

an intermediate rotary member supported on the eccentric portion of the control disc;

a first connecting member for connecting the camshaft with the intermediate rotary member to interlock the intermediate rotary member with the camshaft so as to rotate the intermediate rotary member;

a second connecting member for connecting the intermediate rotary member with the cam lobe to interlock the cam lobe with the intermediate rotary member so as to rotate the cam lobe;

a control member engaged with the control disc; and an actuator for driving the control member in response to a running condition of the internal combustion engine to displace continuously or in stages a center axis in rotation of the cam lobe between a first predetermined position in the side of a low engine speed and a second predetermined position in the side of a high engine speed.

In the variable valve timing mechanism of the present invention having the above construction, when the center axis in rotation of the cam lobe is displaced from the first predetermined position in the side of a low engine speed into the second predetermined position in the side of a high engine speed, the timing of valve operation in the intake valve is advanced so that a peak point in valve lifting curve of the intake valve is moved to its advance side. Consequently, an advantage is found in that the valve overlap period increases to improve the engine cylinder in its trapping efficiency.

BRIEF DESCRIPTION OF THE DRAWINGS

FIG. 9 is a block diagram illustrating a control-flow path along which control in angular position of the control disc relative to the camshaft of the variable valve timing mechanism of the embodiment of the present invention;

FIGS. 10(a), 10(b), 10(c), 10(d) and 10(e) are diagrams showing the valve lift (or travel) plotted against the angular rotation of the crankshaft or camshaft, showing patterns of variation of the valve lifting characteristics obtained, in the variable valve timing mechanism of the embodiment of the present invention, when the eccentric portion of the control disc in the mechanism varies in its angular position relative to the camshaft in a condition in which the eccentric portion of the control disc in the side of each of the intake and the exhaust valve is rotatably driven in a direction opposite to the direction of rotation of the engine;

FIGS. 13(a), 13(b), 13(c) and 13(d) are schematic diagrams showing a second modification of the embodiment of the variable valve timing mechanism of the embodiment of the present invention.

DESCRIPTION OF THE PREFERRED EMBODIMENT

Hereinbelow, the present invention will be described with reference to the accompanying drawings. In its preferred embodiment and modifications, the invention is applied to an internal combustion engine of the reciprocating type, in which a variable valve timing mechanism is provided so as to drive an intake and an exhaust valve. Each of these valves is disposed on an engine cylinder, and will be hereinafter referred to, as a general term, as the "engine valve" or simply as the "valve".

Figure 3:
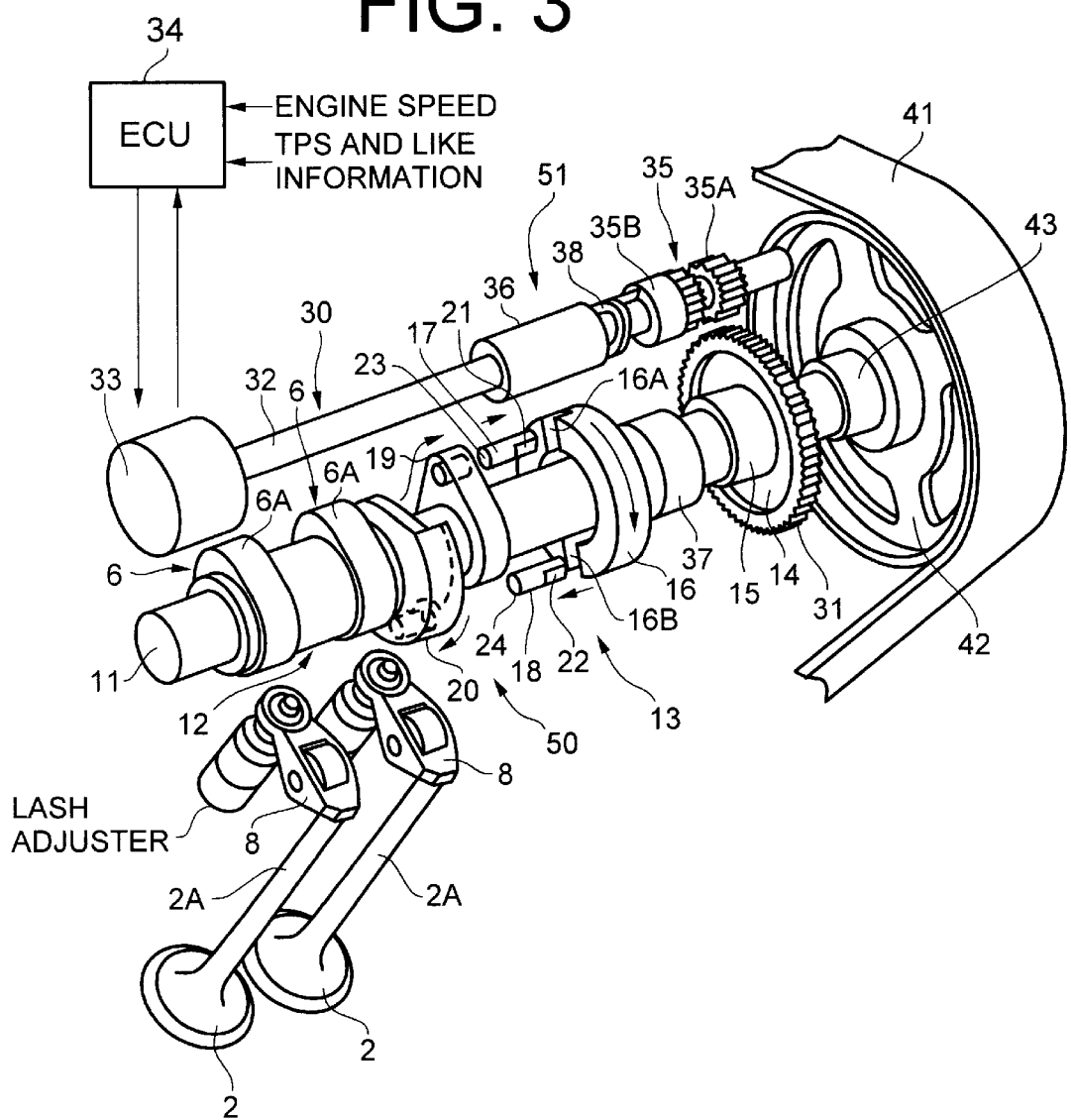
FIG. 3 is a perspective view of essential parts of the variable valve timing mechanism of the embodiment of the present invention.
Figure 4:
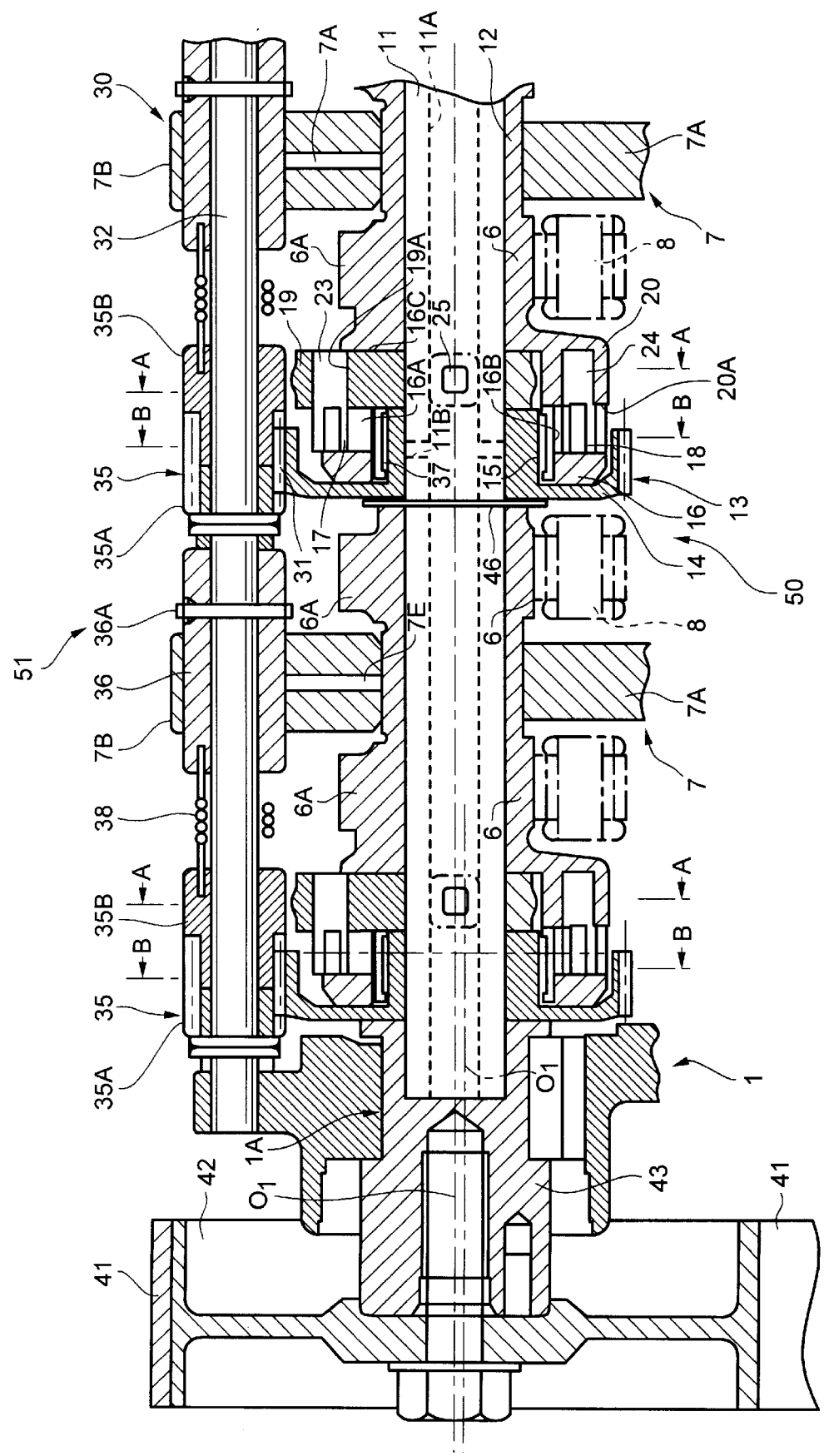
FIG. 4 is a schematic sectional view of the essential parts of the variable valve timing mechanism shown in FIG. 2.
Figure 5:
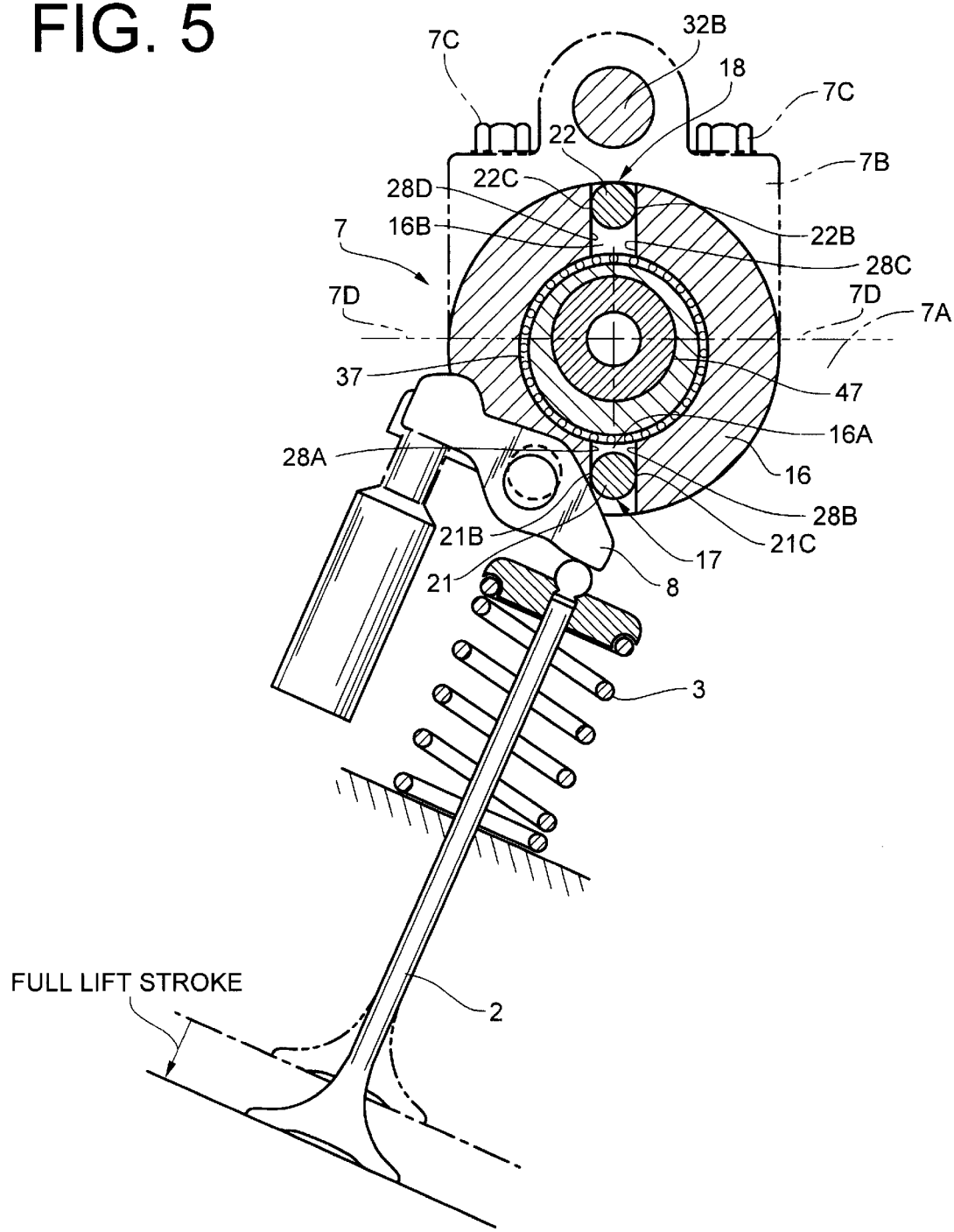
FIG. 5 is a sectional view of essential parts of the non-constant velocity joint used in the variable valve timing mechanism of the embodiment of the present invention.

FIGS. 3, 4 and 5 show essential parts of the variable valve timing mechanism of the preferred embodiment of the present invention. As shown in FIGS. 3 and 4, a plurality of valves 2 for opening and closing an intake and an exhaust port (not shown) of the engine are disposed on a cylinder head 1 (shown in FIG. 4). Each of the valves 2 is provided with a valve stem, an upper end portion 2A (shown in FIG. 3) of which stem is provided with a valve spring 3 (shown in FIG. 5).

As is clear from FIG. 5, the valve 2 has the upper end portion 2A of its valve stem be in abutting engagement with a rocker arm 8, with which a cam 6 is also in abutting engagement. The cam 6 is provided with a convex portion (i.e., cam portion) 6A for opening the valve 2 against a resilient force exerted by the valve spring 3. The variable valve timing mechanism of the present invention functions to rotatably drive this cam 6 relative to a camshaft 11 in order to change an angular position of the cam 6 relative to the camshaft 11.

As shown in FIGS. 3 and 4, the variable valve timing mechanism of the present invention comprises: the camshaft (i.e., first rotary shaft member) 11 which is interlocked with a crankshaft (not shown) of the engine and rotatably driven through a belt (i.e., timing belt) 41 and a pulley 42; and, a cam lobe (i.e., second rotary shaft member) 12 rotatably mounted on the camshaft 11. The cam (i.e., cam portion) 6 is formed in an outer peripheral portion of the cam lobe 12, and radially extends outwardly. Incidentally, as is clear from FIGS. 3 and 4, the cam lobe 12 has its intermediate portion rotatably supported by a bearing portion 7 of the cylinder head 1.

Although the camshaft 11 is supported by the bearing portion 7 through the cam lobe 12 as described above, the cam shaft 11 has its end portions rotatably supported by bearing portions 1A of the cylinder head 1 through end members 43. These members 43 are axially aligned with the end portions of cam shaft 11. Consequently, the above-mentioned pulley 42 is fixedly mounted on one of the end members 43. This end member 43 with the pulley 42 is hereinafter referred to as the torque input portion.

Incidentally, as shown in FIGS. 4 and 5, the bearing portion 7 is of a split type, and, therefore constructed of: a lower half bearing portion 7A formed in the cylinder head 1; an upper half bearing portion (i.e., bearing cap) 7B coupled to the lower half bearing portion 7A from above; and, bolts 7C (shown in phantom lines in FIG. 5).

Further, as shown in FIG. 5, a substantially horizontal abutting plane 7D between the lower half bearing portion 7A and the bearing cap 7B is perpendicular to a longitudinal axis of the engine cylinder (not shown). The lower half bearing portion 7A and the bearing cap 7B are firmly coupled to each other by the bolts 7C which are substantially vertically tightened as viewed from in FIG. 5.

Further, as is clear from FIG. 3, a non-constant velocity joint 13 is disposed between the camshaft 11 and the cam lobe 12, so that the cam lobe 12 and the non-constant velocity joint 13 form an adjustable valve operating means 50 for controlling the timing of valve opening continuously or in stages. Further, the non-constant velocity joint 13 and an angular position adjusting mechanism 30 form a control mechanism 51 which changes the timing of valve opening of the valve 2 in response to a running condition of the engine.

In FIG. 4, the reference numerals and characters 7E, 11A and 11B denote oil passages through which lubricating oil (i.e., engine oil) is supplied to moving parts of the engine.

Incidentally, the variable valve timing mechanism of the present invention is advantageously applied to a multiple cylinder engine. In this case, the cam lobe 12 and the non-constant velocity joint 13 are provided in each of engine cylinders. Hereinbelow, a four cylinder engine will be used in description.

The non-constant velocity joint 13 comprises: a control disc 14 rotatably supported on the camshaft 11; an eccentric portion 15 integrally formed with the control disc 14; an intermediate rotary member 16 mounted on an outer peripheral surface of the eccentric portion 15 of the control disc 14; a first slider member (i.e., first connecting member or camshaft-side pin member) 17 connected with the intermediate rotary member 16; and, a second slider member (i.e., second connecting member or cam lobe-side pin member) 18 connected with the intermediate rotary member 16.

As shown in FIG. 4, the eccentric portion 15 of the control disc 14 has its center of rotation (i.e., second center axis of rotation) 02 deviated or offset from a center of rotation (i.e., first center axis of rotation) 01 of the camshaft 11. In operation, the intermediate rotary member 16 rotates on the second center axis 02 described above.

As is clear from FIG. 3, the first connecting member 17 and the second connecting member 18 are provided with sliding end portion 21 and 22, respectively. The other end portions of these connecting members 17 and 18 form drive pin portions 23 and 34, respectively.

As shown in FIGS. 3 and 4, the intermediate rotary member 16 is provided with a pair of diametrically opposed radial guide grooves 16A and 16B. The connecting members 17 and 18 has their end portions 21 and 22 radially slidably received in these radial guide grooves 16A and 16B of the intermediate rotary member 16, respectively.

As is clear from FIG. 3, the camshaft 11 is provided with a radially outwardly extending drive arm 19. The cam lobe 12 is provided with an arm portion 20 which also radially outwardly extends. The drive arm 19 of the camshaft 11 is provided with an axial hole 19A (shown in FIG. 4) in which the drive pin portion 23 of the first connecting member 17 is rotatably received. On the other hand, the arm portion 20 of the cam lobe 12 is also provided with an axial hole 20A in which the drive pin portion 24 of the second connecting member 18 is rotatably received.

Incidentally, the drive arm 19 is axially disposed between the cam lobe 12 (except the arm portion 20) and the control disc 14, and radially outwardly extends from the camshaft 11. In operation, the drive arm 19 is integrally driven with the camshaft 11 through a lock pin 25 (shown in FIG. 4). On the other hand, the radially outwardly extending arm portion 20 of the cam lobe 12 also axially extends to a position near a side surface of the intermediate rotary member 16.

In operation, as is clear from FIG. 5, torque is transmitted from outer flat surfaces 21B, 21C of the end portion 21 of the first connecting member 17 to the corresponding inner flat surfaces 28D, 28C of the radial guide groove 16A of the intermediate rotary member 16. Torque is also transmitted between the other radial guide groove 16B and the end portion 22 of the second connecting member 18 through outer flat surfaces 22B, 22C of the end portion 22 and the corresponding inner flat surfaces 28B, 28C of the other radial guide groove 16B.

During such transmission of torque in operation, since the intermediate rotary member 16 is eccentrically disposed relative to the camshaft 11, the intermediate rotary member 16 varies in angular velocity when the camshaft 11 keeps its angular velocity constant. Further, the cam lobe 12 is also advanced and retarded in rotation relative to the intermediate rotary member 16 since the cam lobe 12 engages with the intermediate rotary member 16 through the second connecting member 18 slidably received in the radial guide groove 16B of the intermediate rotary member 16, which establishes a non-constant velocity transmitting relationship between the cam lobe 12 and the camshaft 11.

Figure 6:
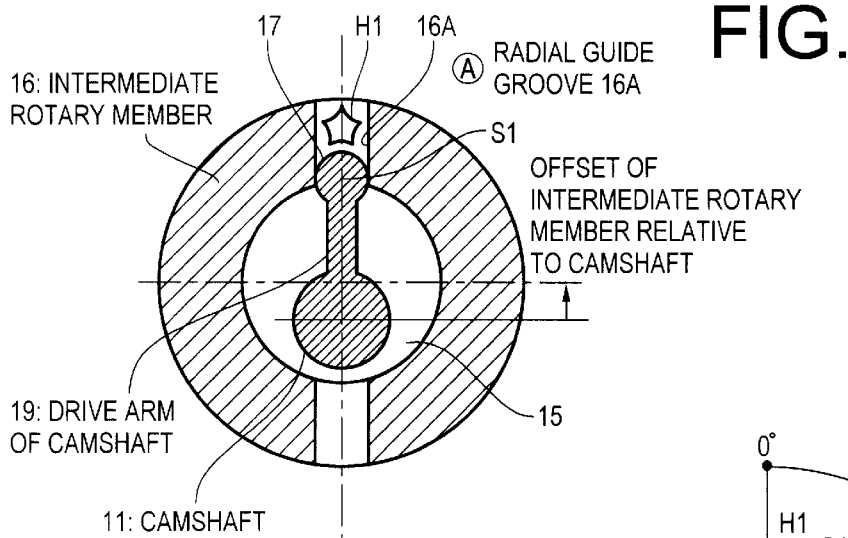
FIGS. 6(A1), 6(A2), 6(A3), 6(B1), 6(B2) and 6(B3) are diagrams illustrating the principles of the non-constant velocity joint used in the variable valve timing mechanism of the embodiment of the present invention.
Figure 6:
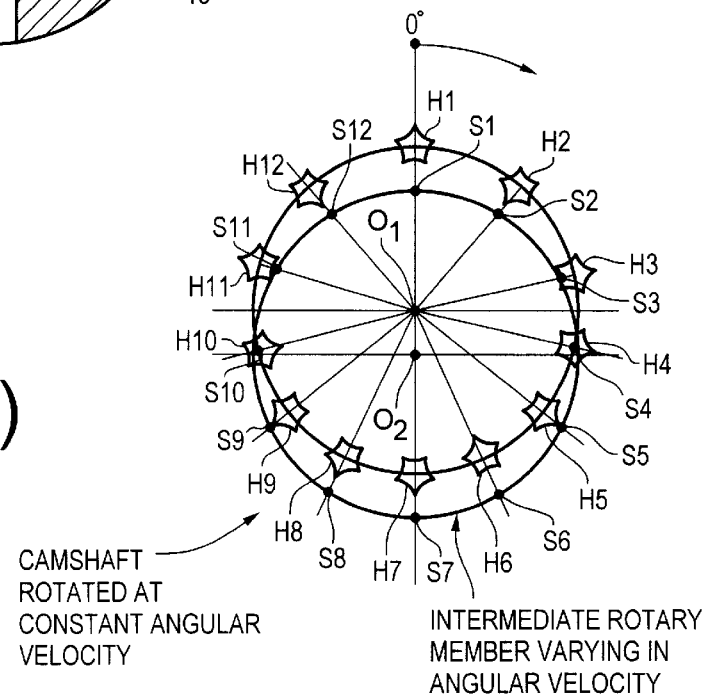
Figure 6:
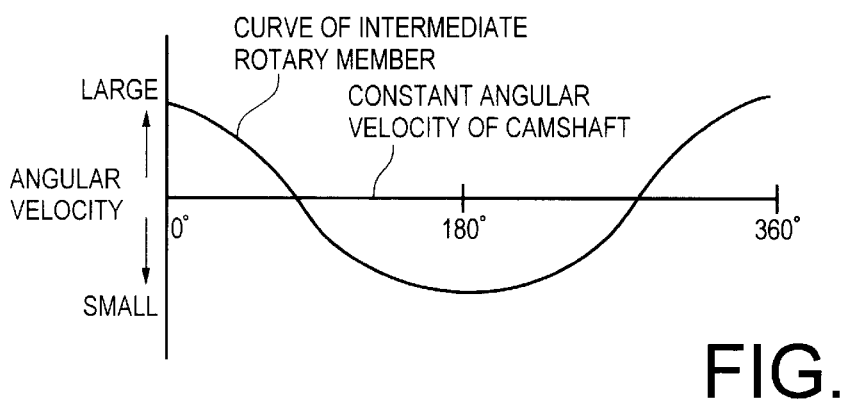

In this connection, for example, with reference to FIGS. 6(A1), 6(A2), 6(A3), 6(B1), 6(B2) and 6(B3), the principles of the non-constant velocity joint 13 used in the variable valve timing mechanism of the present invention will be described. In operation, as shown in FIGS. 6(A1), 6(A2) and 6(A3), the angular velocity of the intermediate rotary member 16 relative to the camshaft 11 varies. On the other hand, as shown in FIGS. 6(B1), 6(B2) and 6(B3), the angular velocity of the cam lobe 12 relative to the intermediate rotary member 16 varies too.

In FIG. 6(A1), the center of rotation (i.e., second center axis of rotation) 02 of the intermediate rotary member 16 is deviated or offset upwardly from the center of rotation (i.e., first center axis of rotation) 01 of the camshaft 11. The fixed reference angular position S1 of each of the radial guide groove 16A and the first connecting member 17 is shown in FIG. 6(A1). Under such circumstances, the camshaft 11 is rotatably driven clockwise in operation.

Incidentally, in FIGS. 6(A1) and 6(A2): the reference numeral and character S1 denotes a fixed reference angular position of the camshaft 11 in a center of the first connecting member 17; and, H1 a fixed reference angular position of the intermediate rotary member 16 in its radial guide groove 16A.

Further, in FIG. 6(A2): the reference numerals and characters S2 to S12 denote angular positions of the camshaft 11 in the center of the first connecting member 17, which angular positions S2 to S12 are spaced apart from each other at predetermined angular intervals (i.e., at intervals of 30 degrees in this embodiment); and, the reference numerals and characters H2 to H12 denote angular positions of the intermediate rotary member 16 in its radial guide groove 16A. As is clear from FIG. 6(A2), these angular positions H2 to H12 are spaced apart from each other at variable angular intervals.

Incidentally, in FIG. 6(A2): a center of rotation of the camshaft 11 plotted using the angular positions S2 to S12 (i.e., first center axis of rotation) is denoted by the reference numeral 01; and, a center of rotation of the intermediate rotary member 16 plotted using the angular positions H2 to H12 (i.e., second center axis of rotation) is denoted by the reference numeral 02.

As shown in FIG. 6(A2), when the camshaft 11 rotates on its center (i.e., first center axis 01) from the angular position S1 to the angular position S2 through an angle of 30 degrees (<S1·01·S2), the intermediate rotary member 16 also rotates from the angular position H1 to the angular position H2 through a first predetermined angle (i.e., <H1·02·H2) larger than 30 degrees. Consequently, in this first predetermined angle, the intermediate rotary member 16 is larger in angular velocity than the camshaft 11.

When the camshaft 11 further rotates from the angular position S2 to the angular position S3 through an angle of 30 degrees (i.e., <S2·01·S3), the intermediate rotary member 16 also further rotates from the angular position H2 to the angular position H3 through a second predetermined angle (i.e., <H2·02·H3) which is still larger than the angle of <S2·01·S3. In other words, between the angular positions H1 and H3, the intermediate rotary member 16 rotates slightly faster than the camshaft 11.

When the camshaft 11 still further rotates to the angular position S4 through an angle of 30 degrees, the intermediate rotary member 16 also still further rotates to the angular position H4 through a third predetermined angle (i.e., <H3·02·H4) which is substantially equal to 30 degrees. In other words, between the angular positions H3 and H4, the intermediate rotary member 16 rotates at substantially the same angular velocity as that of the camshaft 11.

When the camshaft 11 further rotates from the angular position S4 to the angular position S5 through an angle of 30 degrees (i.e., <S4·01·S5), the intermediate rotary member 16 also further rotates from the angular position H4 to the angular position H5 through a fourth predetermined angle (i.e., <H4·02·H5) which is substantially equal to 30 degrees. In other words, between the angular positions H4 and H5, the intermediate rotary member 16 rotates at substantially the same angular velocity as that of the camshaft 11.

When the camshaft 11 still further rotates from the angular position S5 to the angular position S6 through an angle of 30 degrees (i.e., <S5·01·S6), the intermediate rotary member 16 also still further rotates to the angular position H6 through a fifth predetermined angle (i.e., <H5·02·H6) which is smaller than 30 degrees. In other words, between the angular positions H5 and H6, the intermediate rotary member 16 rotates slower than the camshaft 11.

When the camshaft 11 further rotates from the angular position S6 to the angular position S7 through an angle of 30 degrees, the intermediate rotary member 16 also further rotates from the angular position H6 to the angular position H7 through a sixth predetermined angle (i.e., <H6·02·H7) which is smaller than 30 degrees. In other words, between the angular positions H6 and H7, the intermediate rotary member 16 rotates slower than the camshaft 11.

As described above, at the angular position H1, the intermediate rotary member 16 reaches its maximum angular velocity when the camshaft 11 keeps its angular velocity constant. After that, when the camshaft 11 rotates at a constant angular velocity through its angular positions S1, S2, S3, S4, S5, S6 and S7, the intermediate rotary member 16 rotates through its angular positions H1, H2, H3, H4, H5, H6 and H7 while gradually decreasing its angular velocity relative to the camshaft 11. More particularly, during rotation between the angular positions H3 and H5, the intermediate rotary member 16 rotates at substantially the same angular velocity as that of the camshaft 11. After passing through the position H5, the intermediate rotary member 16 rotates clearly slower than the camshaft 11. Then, at the position H7, the intermediate rotary member 16 reaches its minimum angular velocity while the camshaft 11 keeps its angular velocity constant.

After that, when the camshaft 11 rotates through its angular positions S7, S8, S9, S10, S11, S12 and S1, the intermediate rotary member 16 rotates through its angular positions H7, H8, H9, H10, H11, H12 and H1 while gradually increasing its angular velocity. More particularly, during rotation between the angular positions H9 and H10, the intermediate rotary member 16 rotates at substantially the same angular velocity as that of the camshaft 11. After passing through the angular position H10, the intermediate rotary member 16 rotates clearly faster than the camshaft 11. Then, at the angular position H1, the intermediate rotary member 16 reaches its maximum angular velocity while the camshaft 11 keeps its angular velocity constant.

FIG. 6(A3) is a diagram showing the angular velocity of the intermediate rotary member 16 plotted against the angular rotation of the camshaft 11 in a condition in which: the angular position S1 is denoted by a point of 0 degree or a point of 360 degrees on the x-axis of this diagram; and, the camshaft 11 rotates clockwise at a constant angular velocity. As is clear from FIG. 6(A3), a curve of the angular velocity of the intermediate rotary member 16 is sinusoidal.

On the other hand, with reference to FIGS. 6(B1), 6(B2) and 6(B3), variation in angular velocity of the cam lobe 12 relative to the intermediate rotary member 16 will be described. FIGS. 6(A1), 6(A2) and 6(A3) correspond to FIGS. 6(B1), 6(B2) and 6(B3), respectively.

As shown in FIG. 6(B1), the cam lobe 12, which is rotatably mounted on the camshaft 11, is rotatably driven by the intermediate rotary member 16 through the second connecting member 18 and the corresponding radial guide groove 16B, which are oppositely disposed from the first connecting member 17 and the radial guide groove 16A, respectively. Consequently, in an initial condition shown in FIG. 6(A1) in which the center of rotation (i.e., second center axis of rotation) 02 of the intermediate rotary member 16 is deviated or offset upwardly from the center of rotation (i.e., first center axis of rotation) 01 of the camshaft 11, as is clear from FIG. 6(B1), the second connecting member 18 and its corresponding radial guide groove 16B of the intermediate rotary member 16 are angularly spaced apart from the first connecting member 17 and its corresponding radial guide groove 16A of the intermediate rotary member 16 by an angle of 180 degrees, respectively.

Consequently, in FIGS. 6(B1) and 6(B2): the reference numeral and character H'1 denotes a fixed reference angular position of the intermediate rotary member 16 in its radial guide groove 16B; and, R1 a fixed reference angular position of the cam lobe 12 in a center of the second connecting member 18.

Further, in FIGS. 6(B1) and 6(B2): the reference numerals and characters H'2 to H'12 denote angular positions of the intermediate rotary member 16 in its radial guide groove 16B, which angular positions correspond to the angular positions H2 to H12 of the intermediate rotary member 16 in its radial guide groove 16A, respectively; and, R2 to R12 the angular positions of the cam lobe 12 in the center of the second connecting member 18, which angular positions correspond to the angular positions H'2 to H'12 of the intermediate rotary member 16 in its radial guide groove 16B, respectively.

Incidentally, a center of rotation of the intermediate rotary member 16 plotted in FIG. 6(B2) using the angular positions H'2 to H'12 is the center of rotation (i.e., second center axis of rotation) 02. On the other hand, a center of rotation of the cam lobe 12 in the center of the second connecting member 18 plotted in FIG. 6(B2) using the angular positions R2 to R12 is the center of rotation (i.e., first center axis of rotation) 01.

As is clear from FIGS. 6(B2) and 6(B3), the cam lobe 12 has its angular velocity vary more intensively than that of the intermediate rotary member 16 when the camshaft 11 keeps its angular velocity constant. In the angular position R1, the cam lobe 12 reaches its maximum angular velocity relative to the intermediate rotary member 16. After that, when the intermediate rotary member 16 rotates through its angular positions H'1, H'2, H'3, H'4, H'5, H'6 and H'7, the cam lobe 12 rotates through its angular positions R1, R2, R3, R4, R5, R6 and R7 while gradually decreasing its angular velocity relative to the intermediate rotary member 16. More particularly, between the angular positions R3 and R4, the cam lobe 12 rotates at substantially the same angular velocity as that of the intermediate rotary member 16. After that, the cam lobe 12 rotates slower than the intermediate rotary member 16. Then, in the angular position R7, the cam lobe 12 reaches its minimum angular velocity relative to the intermediate rotary member 16.

After that, when the intermediate rotary member 16 rotates through its angular positions H'7, H'8, H'9, H'10, H'11, H'12 and H'1, the cam lobe 12 rotates through its angular positions R7, R8, R9, R10, R11, R12 and R1 while gradually increasing its angular velocity. More particularly, between the angular positions R9 and R10, the cam lobe 12 rotates at substantially the same angular velocity as that of the intermediate rotary member 16. After that, the cam lobe 12 rotates faster than the intermediate rotary member 16. Then, in the angular position R1, the cam lobe 12 reaches its maximum angular velocity relative to the intermediate rotary member 16.

FIG. 6(B3) is a diagram showing the angular velocity of each of the cam lobe 12 and the intermediate rotary member 16 both plotted against the angular rotation of the camshaft 11 in a condition in which: each of the angular positions S1, R7 is denoted by a point of 0 degree or a point of 360 degrees on the x-axis of this diagram; and, the camshaft 11 rotates clockwise at a constant angular velocity. As is clear from FIG. 6(B3), a curve of the angular velocity of the cam lobe 12 is also sinusoidal, but larger in amplitude (i.e., variation in angular velocity) than the curve of the angular velocity of the intermediate rotary member 16.

FIG. 7(c) is a diagram showing advancing and retarding rotation of the cam lobe 12 relative to the camshaft 11, wherein the reference numerals and characters PA1, PA2 denote curves of phase characteristics (i.e., variation in angular position) of the cam lobe 12 relative to the camshaft 11.

More particularly, the curve PA1 in the diagram of FIG. 7(c) shows the phase characteristics of the cam lobe 12, in an initial angular position of which: as shown in FIGS. 6(A1), 6(B1) and 7(a1), the center of rotation (i.e., second center axis of rotation) 02 of the intermediate rotary member 16 is deviated upwardly from the center of rotation (i.e., first center axis of rotation) 01 of both the camshaft 11 and the cam lobe 12; both the radial guide groove 16A of the intermediate rotary member 16 and the first connecting member 17 are above the center axes 01, 02; both the radial guide groove 16B of the intermediate rotary member 16 and the second connecting member 18 are below the center axes 01, 02; and, an initial angular position of the camshaft 11 is shown as a point of 0 degree on the x-axis of the diagram shown in FIG. 7(c).

Figure 7:
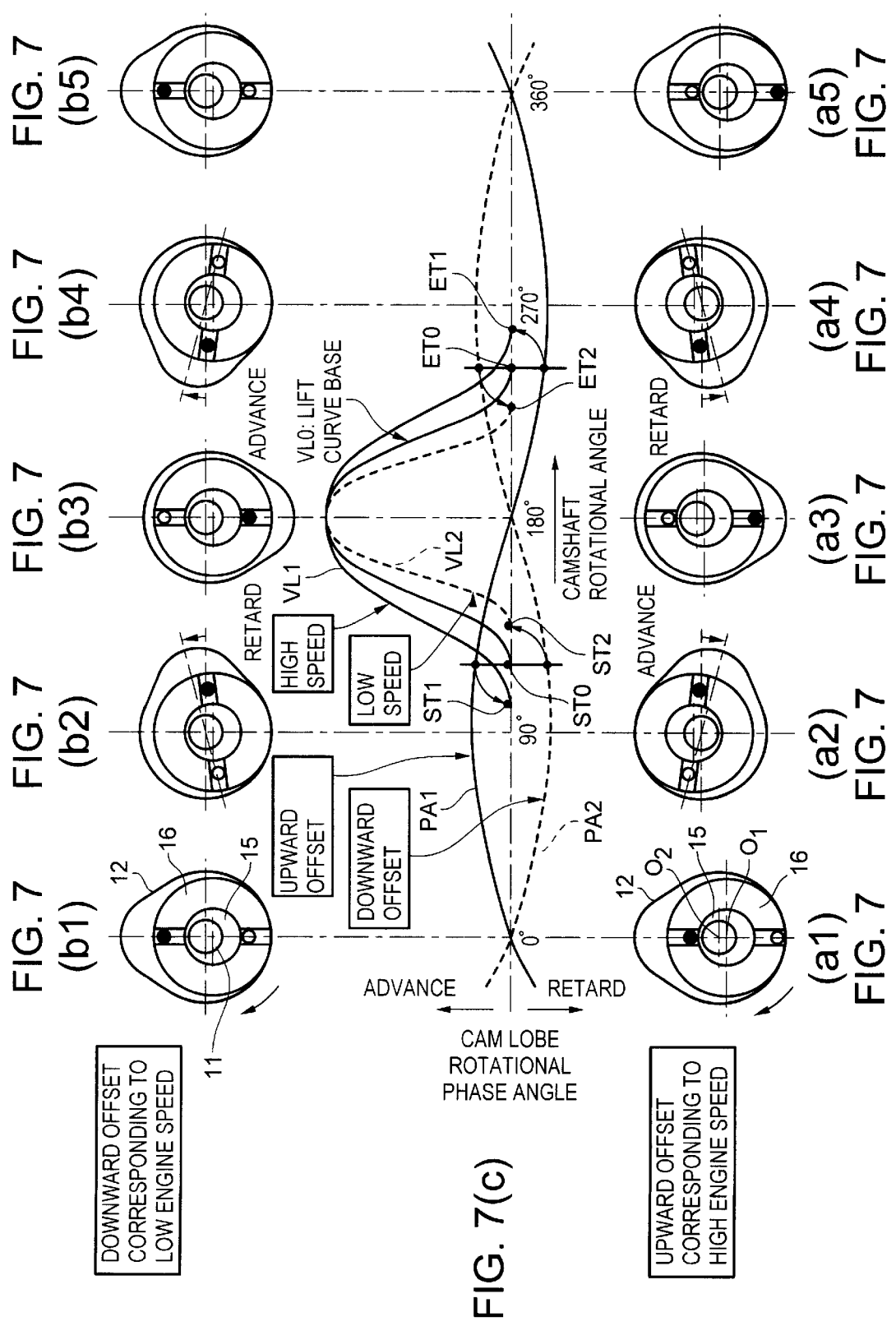
FIGS. 7(a1), 7(a2), 7(a3), 7(a4), 7(a5), 7(b1), 7(b2), 7(b3), 7(b4), 7(b5) and 7(c) are diagrams illustrating the operational characteristics of the non-constant velocity joint used in the variable valve timing mechanism of the embodiment of the present invention.

As is clear from the curve PA1 shown in FIG. 7(c), when the angular position of the camshaft 11 is in a point of 0 degree (as shown in FIG. 7(a1) and as denoted by the reference characters S1, H1, H'1, R1 in FIGS. 6(A2) and 6(B2)) on the x-axis of the diagram of FIG. 7(c), there is no difference in angular position between the cam lobe 12 and the camshaft 11.

After that, the angular position of the cam lobe 12 is advanced and retarded relative to the camshaft 11. Each amount of advance and retard in angular position of the cam lobe 12 is equal to an integral of variation in angular velocity of the cam lobe 12 with respect to the angular position of the camshaft 11, as is clear from the diagram shown in FIG. 6(B3).

Consequently, as shown in the curve PA1 of FIG. 7(c), when the camshaft 11 rotates from the angular position of 0 degree to the angular position of 90 degrees on the x-axis of the diagram of FIG. 7(c), the cam lobe 12 rotates faster than the camshaft 11 so that an advance in angle of the cam lobe 12 gradually increases. When the camshaft 11 reaches the angular position of 90 degrees on the x-axis of the diagram of FIG. 7(c), the cam lobe 12 reaches its full-advance position. After that, when the camshaft 11 rotates from the angular position of 90 degrees to the angular position of 180 degrees on the x-axis of the diagram of FIG. 7(c), the cam lobe 12 gradually loses its advancing rotation relative to the camshaft 11. When the camshaft 11 reaches the angular position of 180 degrees on the x-axis of the diagram in FIG. 7(c), the cam lobe 12 reaches its no-advance position relative to the camshaft 11. In other words, the cam lobe 12 and the camshaft 11 is in the same angular position, as is clear from FIG. 7(a3).

Further, when the camshaft 11 rotates from the angular position of 180 degrees to the angular position of 270 degrees on the x-axis of the diagram in FIG. 7(c), the cam lobe 12 gradually enhances its retarding rotation relative to the camshaft 11. When the cam lobe 12 reaches the angular position of 270 degrees on the x-axis of the diagram in FIG. 7(c), the cam lobe 12 reaches its full-retard position, as is clear from FIG. 7(a4). After that, when the camshaft 11 rotates from the angular position of 270 degrees to the angular position of 360 degrees on the x-axis of the diagram in FIG. 7(c), the cam lobe 12 gradually loses its retarding rotation relative to the camshaft 11. When the cam lobe 12 reaches the angular position of 360 degrees on the x-axis of the diagram in FIG. 7(c), the cam lobe 12 reaches its no-retard position relative to the camshaft 11. In other words, the cam lobe 12 and the camshaft 11 is in the same angular position, as is clear from FIG. 7(a5).

In this connection, when the valve 2 is adjusted in valve lift relative to the cam 6 so as to have its valve lift reach its full lift in the angular position of 180 degrees on the x-axis of the diagram of FIG. 7(c), variation in valve lift of the valve 2 may be plotted against the angular rotation of the camshaft 11 so as to form a curve VL1 shown in FIG. 7(c). Incidentally, another curve VL0 in FIG. 7(c) is a valve lift curve showing variation in valve lift of the valve 2 in a condition in which the non-constant velocity joint 13 (which comprises the intermediate rotary member 16, control disc 14 and the like) is eliminated, and, therefore there is no difference in angular position between the cam lobe 12 and the camshaft 11 during rotation.

As is clear from FIG. 7(c), a timing ST1 of valve opening in the curve VL1 is earlier than a timing ST0 of valve opening in the curve VL0. On the other hand, a timing ET1 of valve closure in the curve VL1 is later than a timing ET0 of valve closure in the curve VL0. The reason why the valve opening timing ST1 is earlier than the valve opening timing ST0 is that: in a valve opening area between the angular position of 90 degrees and the angular position of 180 degrees on the x-axis of the diagram shown in FIG. 7(c), the cam lobe 12 is still in its advancing rotation relative to the camshaft 11. On the other hand, the reason why the valve closure timing ET1 is later than the valve closure timing ET0 is that: in an area of the end of valve opening between the angular position of 180 degrees and the angular position of 270 degrees on the x-axis of the diagram shown in FIG. 7(c), the cam lobe 12 is in its retarding rotation relative to the camshaft 11.

In this connection, a curve PA2 in the diagram of FIG. 7(c) shows the phase characteristic of the cam lobe 12, in an initial angular position of which: as shown in FIG. 7(b1), the center of rotation (i.e., second center axis of rotation) 02 of the intermediate rotary member 16 is deviated or offset downwardly from the center of rotation (i.e., first center axis of rotation) 01 of both the camshaft 11 and the cam lobe 12; both the radial guide groove 16A of the intermediate rotary member 16 and the first connecting member 17 are above the center axes 01, 02; both the radial guide groove 16B of the intermediate rotary member 16 and the second connecting member 18 are below the center axes 01, 02; and, an initial angular position of the camshaft 11 is in a point of 0 degree on the x-axis of the diagram shown in FIG. 7(c).

As is clear from the curve PA2 shown in FIG. 7(c), when the angular position of the camshaft 11 is in the angular position of 0 degree on the x-axis of the diagram FIG. 7(c), there is no difference in angular position between the cam lobe 12 and the camshaft 11. After that, in the diagram shown in FIG. 7(c), when the camshaft 11 rotates from the angular position of 0 degree to the angular position of 90 degrees on the x-axis of the diagram in FIG. 7(c), the cam lobe 12 gradually enhances its retarding rotation relative to the camshaft 11. When the camshaft 11 reaches the angular position of 90 degrees on the x-axis of the diagram of FIG. 7(c), the cam lobe 12 reaches its full-retard position, as shown in FIG. 7(b2). After that, when the camshaft 11 rotates from the angular position of 90 degrees to the angular position of 180 degrees on the x-axis of the diagram of FIG. 7(c), the cam lobe 12 gradually loses its retarding rotation relative to the camshaft 11. When the camshaft 11 reaches the position of 180 degrees on the x-axis of the diagram in FIG. 7(c), the cam lobe 12 reaches its no-retard position relative to the camshaft 11. In other words, the cam lobe 12 and the camshaft 11 is in the same angular position, as is clear from FIG. 7(b3).

Further, when the camshaft 11 rotates from the angular position of 180 degrees to the angular position of 270 degrees on the x-axis of the diagram in FIG. 7(c), the cam lobe 12 gradually enhances its advancing rotation relative to the camshaft 11. When the cam lobe 12 reaches the angular position of 270 degrees on the x-axis of the diagram in FIG. 7(c), the cam lobe reaches its full-advance position, as shown in FIG. 7(b4). After that, when the camshaft 11 rotates from the angular position of 270 degrees to the angular position of 360 degrees on the x-axis of the diagram in FIG. 7(c), the cam lobe 12 gradually loses its advancing rotation relative to the camshaft 11. When the cam lobe 12 reaches the angular position of 360 degrees on the x-axis of the diagram in FIG. 7(c), the cam lobe reaches its no-advance position relative to the camshaft 11. In other words, the cam lobe 12 and the camshaft 11 is in the same angular position, as is clear from FIG. 7(b5).

As described above, when the cam lobe 12 has a phase characteristic curve PA2 shown in FIG. 7(c), a dotted curve VL2 in FIG. 7(c) shows the valve lift characteristics of the valve 2.

As is clear from FIG. 7(c), a timing ST2 of valve opening in the dotted curve VL2 is later than the timing ST0 of valve opening in the curve VL0. On the other hand, a timing ET2 of valve closure in the dotted curve VL2 is earier than the timing ET0 of valve closure in the curve VL0.

The reason why the valve opening timing ST2 is later than the valve opening timing ST0 is that: in an area of the start of valve opening between the angular position of 90 degrees and the angular position of 180 degrees on the x-axis of the diagram shown in FIG. 7(c), the cam lobe 12 is still in its retarding rotation relative to the camshaft 11. On the other hand, the reason why the valve closure timing ET2 is earier than the valve closure timing ET0 is that: in an area of the end of valve opening between the angular position of 180 degrees and the angular position of 270 degrees on the x-axis of the diagram shown in FIG. 7(c), the cam lobe 12 is in its advancing rotation relative to the camshaft 11.

As described above, the valve 2 has its valve lift characteristics vary in response to an amount of offset or eccentricity of the second center axis 02 of the intermediate rotary member 16. When the valve opening timing is advanced while the valve closure timing is retarded, the duration of valve opening may be increased, which is suitable for a high engine speed. On the other hand, when the valve opening timing is retarded while the valve closure timing is advanced, the duration of valve opening may be decreased, which is suitable for a low engine speed.

More particularly, as shown in FIG. 7(a1), when the second center axis 02 of the intermediate rotary member 16 is deviated or offset upwardly from the first center axis 01 of the camshaft 11 (i.e., deviated in a direction opposite to the angular position where the valve lift top is given), the duration of valve opening reaches its maximum value suitable for a high engine speed. In contrast with this, as shown in FIG. 7(b1), when the second center axis 02 of the intermediate rotary member 16 is deviated or offset downwardly from the first center axis 01 of the camshaft 11 (i.e., deviated in a direction of the angular position where the valve lift top is given), the duration of valve opening reaches its minimum value suitable for a low engine speed.

Further, when the second center axis 02 of the intermediate rotary member 16 is in an intermediate position between its upwardly deviated position shown in FIG. 7(a1) and its downwardly deviated position shown in FIG. 7(b1), the valve 2 is operated in a valve opening and a valve closing timing depending on such intermediate position of the second center axis 02.

More specifically, when the second center axis 02 is gradually deviated or offset downwardly from its upwardly deviated position shown in FIG. 7(a1), differences between: the valve lift characteristic curve VL1 for a high engine speed; and, the curve VL0 are decreased. When the second center axis 02 and the first center axis 01 are substantially in the same level (i.e., there is substantially no offset therebetween), the curve VL0 substantially shows the valve lift characteristics of the valve 2. After that, as shown in FIG. 7(b1), when the second center axis 02 is gradually deviated or offset downwardly, the valve lift characteristics of the valve 2 gradually approach the curve VL2 (which is suitable for a low engine speed) from the curve VL0.

Consequently, in operation, when an offset amount of the second center axis 02 relative to the first center axis 01 is adjusted continuously or in stages in response to a running condition (i.e., engine speed and like parameters) of the engine, it is possible to operate the valve 2 in a manner most suitable for the running condition of the engine without fail.

It is possible to adjust the offset amount of the second center axis 02 relative to the first center axis 01 by rotating the eccentric portion 15 of the control disc 14 (shown in FIG. 3) relative to the camshaft 11, which portion 15 eccentrically supports the intermediate rotary member 16 thereon. Consequently, in the variable valve timing mechanism of the present invention, there is provided an angular position control mechanism 30 for adjusting the angular position of the eccentric portion 15 of the control disc 14 relative to the camshaft 11 by rotating the control disc 14.

As shown in FIGS. 3 and 4, this eccentric angular position control mechanism 30 comprises: an eccentiricity control gear 31 formed in an outer peripheral portion of the control disc 14; a gear shaft (i.e., control shaft or control member) 32 which is provided with a control gear 35 and disposed parallel to the camshaft 11, the control gear 35 being meshed with the eccentiricity control gear 31; and, an actuator 33 for rotatably driving the control shaft 32. The eccentric angular position control mechanism 30 having the above construction is controlled in operation by an engine control unit (i.e., ECU) 34, as shown in FIGS. 3.

More particularly, as shown in FIGS. 3, in operation, the ECU 34 receives various pieces of current information, for example such as a current engine speed detected by an engine speed sensor (not shown), a current TPS (i.e., throttle position) information supplied from a throttle position sensor (not shown), a current AFS (i.e., air flow sensor) information supplied from an air flow sensor (not shown), and like pieces of current information. Based on the above various pieces of current information, the actuator (motor) 33 of the control mechanism 30 is controlled in response to required engine speed and load.

In operation, for example, when a current engine speed and a current engine load are high, in order to increase the duration of valve opening, it is necessary to control the control disc 14 in its angular position relative to the camshaft 11 so as to realize the valve lift characteristics expressed by the curve VL1 shown in FIG. 7(c). On the other hand, when the current engine speed and load are low, in order to decrease the duration of valve opening, it is necessary to control the control disc 14 in its angular position relative to the camshaft 11 so as to realize the valve lift characteristics expressed by the curve VL2 shown in FIG. 7(c). In general, in response to the current engine speed and load, the control disc 14 is controlled in its angular position relative to the camshaft 11 so as to realize the valve lift characteristics expressed by a suitable curve appearing in an area between the curves VL1 and VL2 shown in FIG. 7(c).

In construction, the control gear 35 mounted on the control shaft 32 is a scissors gear constructed of a pair of gears 35A, 35B. Of these gears, one 35A is fixedly mounted on the control shaft 32, while the other 35B is rotatably mounted on the control shaft 32. More particularly, the rotatable gear 35B is in abutting engagement with the gear 35A, and receives torque from the control shaft 32 through a torsion spring 38 interposed between the gear 35B and a journal member 36 which is fixedly mounted on an outer peripheral surface of the control shaft 32. These gears 35A, 35B function to take up the backlash of the eccentricity control gear 31 which meshes with the control gear 35.

Incidentally, in setting of the eccentric angular position control mechanism 30, as shown in FIG. 3, as a first step, the gears 35A, 35B are meshed with the eccentricity control gear 31 of the control disc 14 already mounted on the camshaft 11. After that, the journal member 36 is rotatably and axially movably mounted on the control shaft 32, and axially moved to its predetermined mounting position while being rotated relative to the control shaft 32 to facilitate its axial movement, and then fixed to the control shaft 32 by means of a lock pin 36A (shown in FIG. 4), so that the journal member 36 exerts an axial force on the gear 35B through the torsion spring 38 thereby transmitting a torque to the gear 35B.

Figure 8:
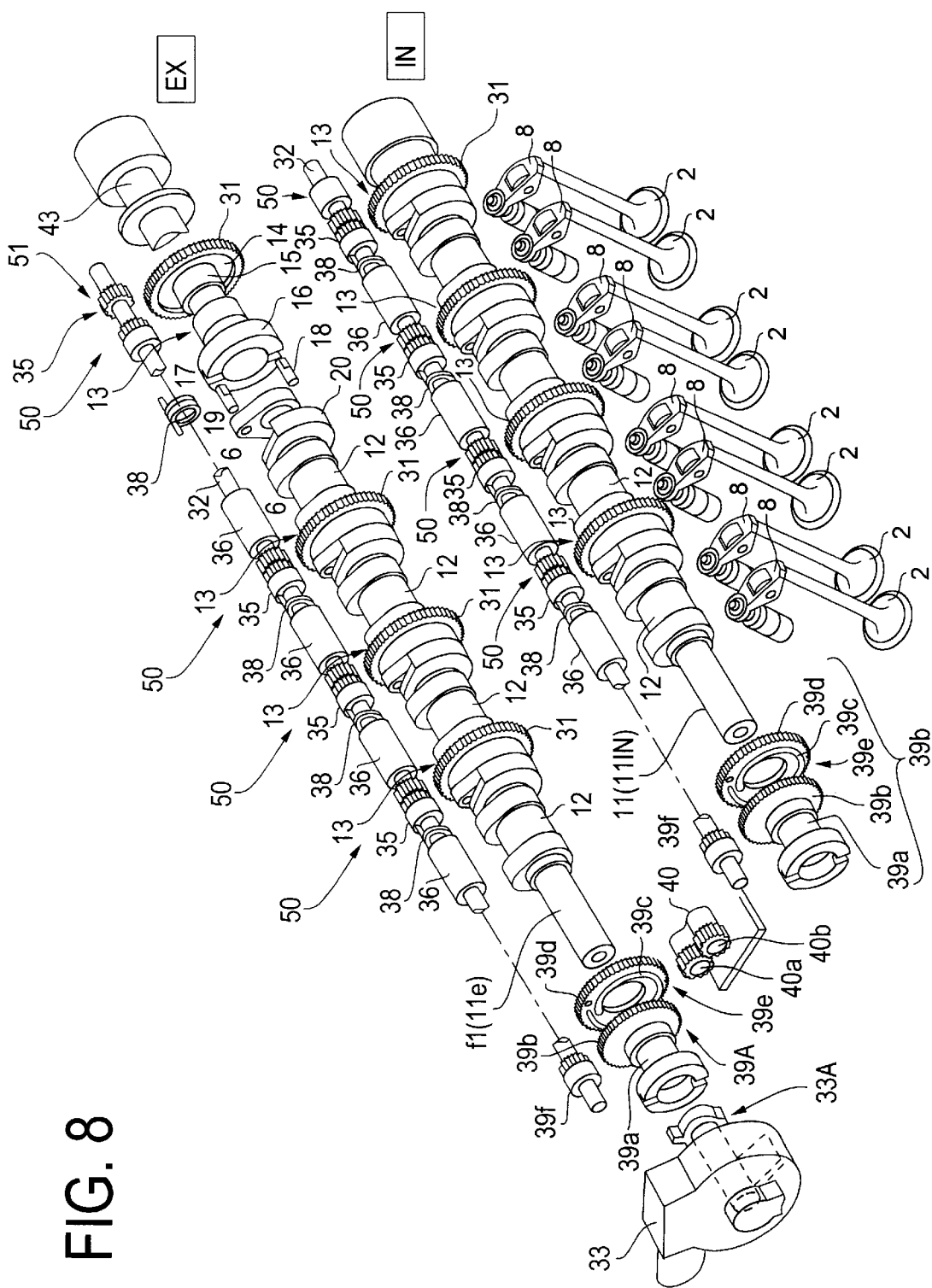
FIG. 8 is a perspective exploded view of the variable valve timing mechanism of the embodiment of the present invention.

When the variable valve timing mechanism of the present invention is used in a multiple cylinder engine (i.e., four cylinder engine in this embodiment), the cam lobe 12 and the non-constant velocity joint 13, which form an adjustable valve operating means 50, are mounted on each of the engine cylinders. In this case, the variable valve timing mechanism of the present invention is provided in the side of each of the intake and the exhaust valve of the individual engine cylinders. More particularly, as shown in FIG. 8, a camshaft $11_{IN}$ for operating the intake valve and a camshaft $11_{EX}$ for operating the exhaust valve are provided in each of the engine cylinders. Further, in each of the camshafts $11_{in}$ and $11_{EX}$, there is provided the adjustable valve operating means 50, which is constructed of the cam lobe 12 and the non-constant velocity joint 13, as described above.

As is clear from FIG. 8, the eccentric angular position control mechanism 30 comprises: the eccentricity control gear 31 of the control disc 14 rotatably mounted on the camshaft $11_{IN}$ is in the individual engine cylinders; the eccentricity control gear 31 of the control disc 14 rotatably mounted on the camshaft $11_{EX}$ in the individual engine cylinders; the control shaft 32 adjacent to the camshaft $11_{IN}$; the control shaft 32 adjacent to the camshaft $11_{EX}$; the control gear 35 meshed with each of the eccentricity control gears 31; and, the journal members 36 and the torsion spring 38 mounted on each of the control shaft 32 in the individual engine cylinders.

On the other hand, the actuator 33 is provided in one of opposite sides of a cylinder head (not shown) of an engine block (not shown) of the engine, in the other of which sides a sprocket 43 is provided, as shown in FIG. 8 in which the actuator 33 is mounted on an end portion of the camshaft $11_{EX}$.

The actuator 33 is connected with an exhaust-valve-side drive gear mechanism 39A through a joint member 33A. Torque is transmitted from the actuator 33 to the exhaust-valve-side control shaft 32 through the drive gear mechanism 39A, so that the individual eccentricity control gears 31 rotatably mounted on the camshaft $11_{EX}$ are rotatably driven by the actuator 33.

On the other hand, the exhaust-valve-side drive gear mechanism 39A is connected with an intake-valve-side drive gear mechanism 39B through an intermediate gear mechanism 40. Torque is transmitted from the actuator 33 to the intake-valve-side control shaft 32 through the exhaust-valve-side drive gear mechanism 39A, intermediate gear mechanism 40 and the intake-valve-side drive gear mechanism 39B, so that the individual eccentricity control gears 31 rotatably mounted on the camshaft $11_{in}$ are rotatably driven by the actuator 33 relative to the camshaft 11 in adjusting the angular position of the control gear 31 of the control disc 14.

Consequently, as shown in the block diagram of FIG. 9, in the side of the exhaust valve (i.e., EX shown in the block drawing), torque generated in the actuator 33 is transmitted to the individual eccentricity control gears 31 through the drive gear mechanism 39A, exhaust-valve-side control shaft 32 and the individual control gears 35. On the other hand, in the side of the intake valve (i.e., IN shown in the block drawing), torque generated in the actuator 33 is transmitted to the individual eccentricity control gears 31 through the drive gear mechanism 39A, intermediate gear mechanism 40, drive gear mechanism 39B, intake-valve-side control shaft 32 and the individual control gears 35.

As is clear from FIG. 8, the intermediate gear mechanism 40 is constructed of a plurality of gears (i.e., gears 40a, 40b, provided that a gear 40c shown is not used in this case). These gears 40a, 40b mesh with each other to rotate a shaft 39a of the intake-valve-side drive gear mechanism 39B in a direction counter to that of a shaft 39a of the exhaust-valve-side drive gear mechanism 39A at the same speed as that of the latter.

Incidentally, as shown in FIG. 8, each of the drive gear mechanisms 39A, 39B comprises: a scissors gear 39e constructed of a fixed gear 39b, a movable gear 39d and a spring member 39c, all of which are mounted on the shaft 39a, wherein the fixed gear 39b is fixedly mounted on the shaft 39a, while the movable gear 39d is rotatably and axially movably mounted on the shaft 39a, the spring member 39c being interposed between these gears 39b and 39d; and, a gear 39f fixedly mounted on an end portion of the control shaft 32. More specifically, in the scissors gear 39e, both the fixed gear 39b and the movable gear 39d are meshed with the gear 39f in a condition in which the movable gear 39d is urged in a direction of its rotation under the influence of a resilient force exerted by the spring member 39c, so that any backlash is taken up in the drive gear mechanisms 39A, 39B.

Further, the number of teeth in each of the gears 39b, 39d forming the scissors gear 39e in the individual drive gear mechanisms 39A, 39B is the same as that in each of the eccentiricity control gears 31 of the control disc 14, and the number of teeth in the gear 39f is the same as that in each of the control gears 35, so that the eccentricity control gear 31 actuator 33 has its angular position be equal to the angular position of a shaft 54 (shown in FIG. 8) of the actuator 33.

As described above, when it is desired to adjust the angular position (i.e., phase in rotation) of the eccentric portion 15 of the control disc 14, the eccentric angular position control mechanism 30 is used to rotatably drive the control disc 14. In this connection, the valve lift characteristics of the valve 2 depend on a direction of rotation of the control disc 14. In other words, the engine performance depends on the direction of rotation of the control disc 14 in adjusting the angular position of the eccentric portion 15 of the control disc 14.

More specifically, as described above, in adjusting the angular position of the eccentric portion 15 of the control disc 14, when the second center axis 02 of each of the eccentric portion 15 and the intermediate rotary member 16 is gradually deviated or offset downwardly from an upwardly deviated position shown in FIG. 7(a1) to a downwardly deviated position shown in FIG. 7(b1), the valve lift characteristics of the valve 2 gradually approach the dotted-line curve VL2 (which is suitable for a low engine speed) from the solid-line curve VL1 (which is suitable for a high engine speed). At this time, the locus or path of the second center axis 02 of the eccentric portion 15 varies in response to the direction of rotation of the control disc 14 relative to the camshaft 11 in adjusting the angular position of its eccentric portion 15, and, therefore the valve lift characteristics also varies in response to the direction of rotation of the control disc 14 relative to the camshaft 11 in the above adjusting.

For example, in adjusting the angular position of the eccentric portion 15 from its downwardly deviated position to its upwardly deviated position, when the control disc 14 is rotated relative to the camshaft 11 in a direction counter to the direction of rotation of the engine in each of the intake side (i.e., IN) and the exhaust side (i.e., EX), the valve lift characteristics of the valve 2 varies as shown in FIGS. 10(a), 10(b), 10(c), 10(d) and 10(e). More particularly, as shown in these drawings, the angular position of the eccentric portion 15 of the control disc 14 relative to the camshaft 11 varies at intervals of 45 degrees on the x-axis of the diagram of each of FIGS. 1(b), 10(c), 10(d) and 10(e) in adjusting the angular position of the eccentric portion 15. In such adjusting in each side of the IN and the EX both shown in FIG. 10(a), 10(b), 10(c), 10(d) and 10(e), as a first step the timing of valve opening is gradually advanced, and then the timing of valve closure is gradually retarded, so that an overlap period of the intake and the exhaust valve is gradually increased. Incidentally, at this time, a full-lift point of the valve 2 is moved in the same direction as that of displacement of each of the timing of valve opening and the timing of valve closure, so that an area obtained by integrating a valve lift curve with respect to the crankshaft angle is gradually increased, wherein the valve lift curve (i.e., travel) is plotted against the angular rotation of the crankshaft, as shown in FIGS. 10(a), 10(b), 10(c), 10(d) and 10(e). The above action is effective in increasing the valve overlap period and in improving the trapping efficiency of each of the engine cylinders. Incidentally, displacement in full-lift point of the valve is inherent in the related art using the non-constant velocity joint such as the variable valve timing mechanism of the present invention.

Namely, the timing of valve opening and the timing of valve closure vary in response to a direction in which the eccentric portion 15 of the control disc 14 is rotated relative to the camshaft 11 in adjusting its angular position relative to the camshaft 11, wherein the direction of rotation of the control disc 14 is the same as that of the engine rotation or counter thereto. Consequently, the engine performance also depends on the direction of rotation of the control disc 14 relative to the camshaft 11 in adjusting the angular position of its eccentric portion 15. Incidentally, in this case, in accordance with the direction of rotation of the control disc 14 relative to the camshaft 11 in adjusting the angular position of its eccentric portion 15, the timing of valve opening is changed before the timing of valve closure is changed, or alternatively the timing of valve closure is changed before the timing of valve opening is changed. After completion of such adjusting of the angular position of the eccentric portion 15 relative to the camshaft 11, it is natural that the valve 2 reaches the same valve lift characteristics regardless of the direction of rotation of the control disc 14 in adjusting the angular position of its eccentric portion 15 relative to the camshaft 11.

Consequently, in the variable valve timing mechanism of the present invention, in view of the engine power output characteristics and the like, when a running condition of the engine is changed from a low engine speed to a high engine speed, as a first step the timing of valve opening is changed so as to increase an overlap period of the intake and the exhaust valve.

Figure 1A:
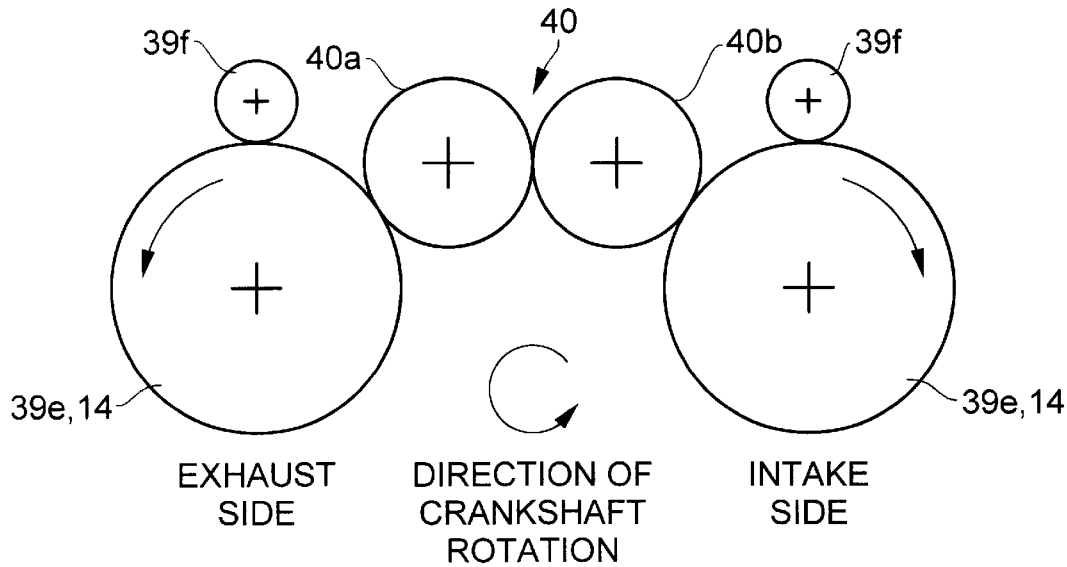
FIGS. 1(a), 1(b), 1(c) and 1(d) are schematic diagrams showing and describing, in construction and operation, essential parts of the variable valve timing mechanism of an embodiment of the present invention.
Figure 2:
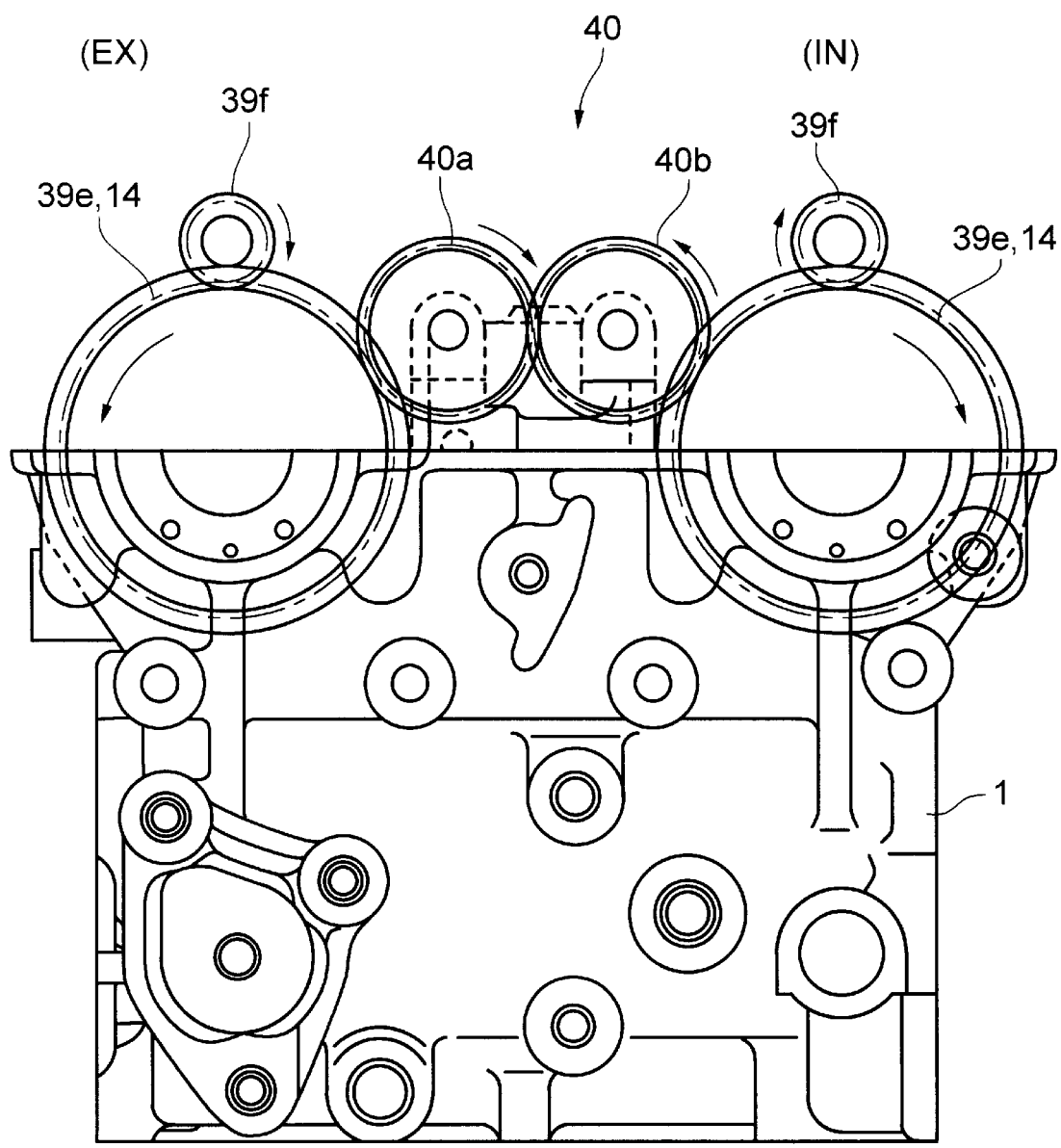
FIG. 2 is a schematic diagram of the variable valve timing mechanism of the embodiment of the present invention.

More concretely, in this embodiment, when the running condition of the engine is changed from a low engine speed to a high engine speed, the drive gear 39e is rotatably driven in a direction indicated by the arrow shown in FIGS. 1(a) and 2. Namely, in this case, the control disc 14 in the side of the intake valve is rotatably driven clockwise, as viewed in FIGS. 1(a) and 2. On the other hand, the control disc 14 in the side of the exhaust valve is driven counterclockwise, as viewed in FIGS. 1(a) and 2. In this embodiment, both the engine (i.e., crankshaft) and the camshaft 11 also rotate counterclockwise, as viewed in FIGS. 1(a) and 2. Incidentally, FIGS. 1(a) and 2 show the valve operating mechanism of the engine, as viewed from the side of the actuator 33 (shown in FIG. 8).

Further, in this embodiment, as shown in FIG. 2, since the intermediate gear 40 is constructed of a plurality of gears (i.e., the gears 40a, 40b) the number of which is an even number in this embodiment, the control disc 14 in the side of the intake valve is rotatably driven in the direction counter to that of the control disc 14 in the side of the exhaust valve. More specifically, the control disc 14 in the side of the intake valve is driven clockwise by the actuator 33 through: the drive gear 39e rotated counterclockwise in the side of the exhaust valve side; the gear 40a rotated clockwise; the gear 40b rotated counterclockwise; the drive gear 39e rotated clockwise in the side of the intake valve; and, the control shaft 32 rotated counterclockwise. Incidentally, the control disc 14 in the side of the exhaust valve is driven counterclockwise by the actuator 33 through: the drive gear 39e rotated counterclockwise in the side of the exhaust valve side; and, the control shaft 32 rotated clockwise.

Figure 1B:
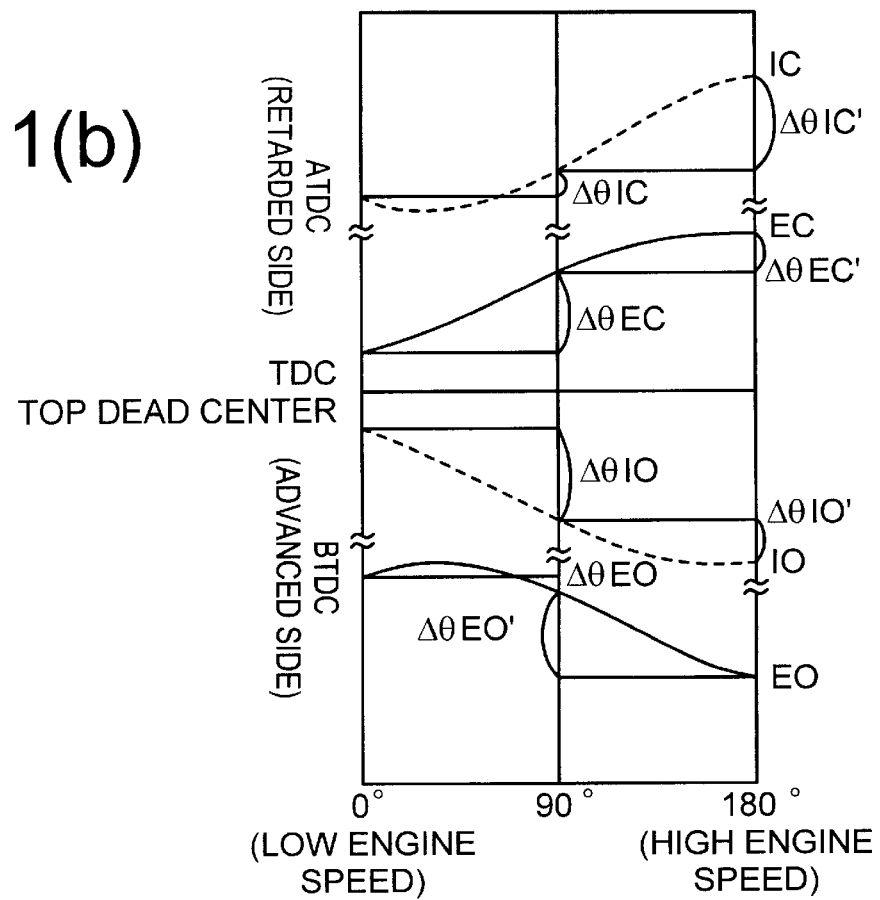

In this case, the valve 2 has the valve lift characteristics shown in a diagram of FIG. 1(b), wherein: a horizontal axis (i.e., x-axis) represents the angular position of the eccentric portion 15 of the control disc 14 in adjusting the angular position of the eccentric portion 15 relative to the camshaft 11; a vertical axis (i.e., y-axis) represents the angular rotation of the crankshaft (i.e., crankshaft angle); an upper half of the diagram above a horizontal line of TDC (i.e., top dead center) covers an area of retarding rotation of the control disc 14; and, a lower half of the diagram below the line of TDC covers an area of advancing rotation of the control disc 14; a dotted-line curve shows variation in valve timing of the intake valve; and a solid-line curve shows variation in valve timing of the exhaust valve. Consequently, of a plurality of the angular positions of the eccentric portion 15 of the control disc 14: the angular position of "0 degree on the x-axis of the diagram of FIG. 1(b)" corresponds to a state shown in FIG. 7(b1) in which the second center axis 02 of the intermediate rotary member 16 has been deviated or offset downwardly relative to the first center axis 01 of each of the camshaft 11 and the cam lobe 12; and, the angular position of "180 degrees on the x-axis of the diagram of FIG. 1(b)" corresponds to a state shown in FIG. 7(a1) in which the second center axis 02 of the intermediate rotary member 16 has been deviated or offset upwardly relative to the first center axis 01 of each of the camshaft 11 and the cam lobe 12.

Figure 1C:
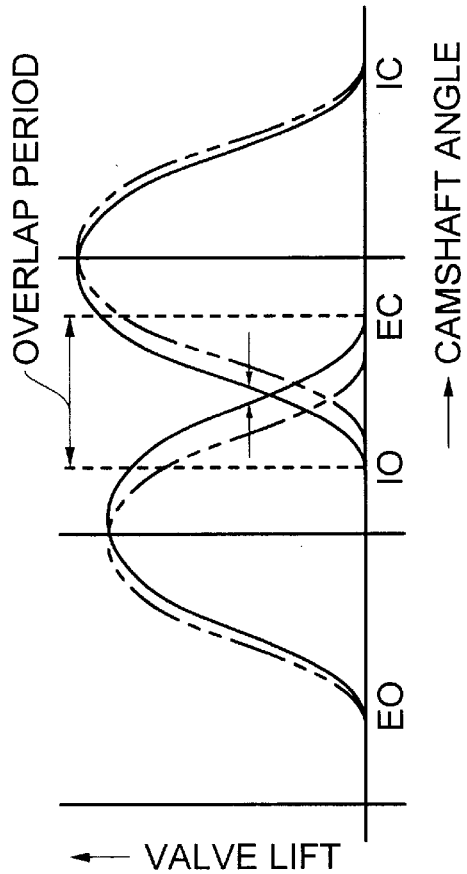
Figure 1D:
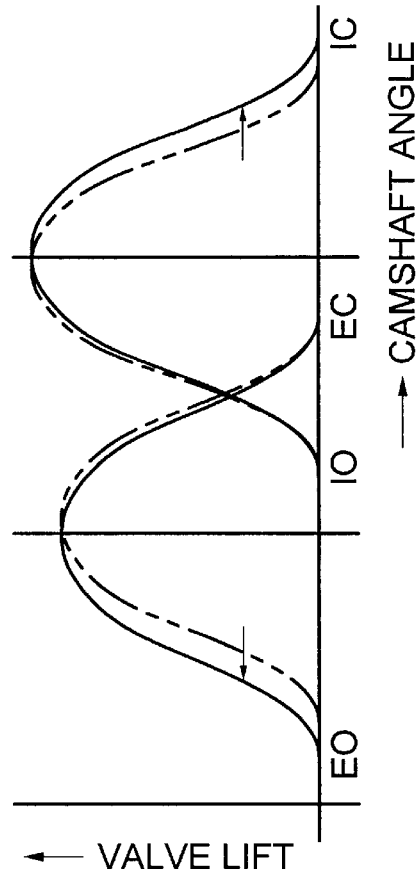

FIGS. 1(c) and 1(d) are diagrams showing the valve lift travel plotted against the angular rotation of the crankshaft (i.e., crankshaft angle), wherein: the diagram shown in FIG. 1(c) is obtained in a condition in which the angular position of the control disc 14 relative to the camshaft 11 has been already changed from a point of 0 degree to a point of 90 degrees on the x-axis of the diagram of FIG. 1(b); and, the diagram shown in FIG. 1(d) is obtained in a condition in which the angular position of the control disc 14 relative to the camshaft 11 has been already changed from a point of 90 degrees to a point of 180 degrees.

As described above, the control disc 14 in the side of the intake valve is rotated relative to the camshaft 11 in a direction counter to that of the control disc 14 in the side of the exhaust valve, and also counter to that of the camshaft 11. Under such circumstances, now, the behavior of the valve will be described with reference to FIGS. 1(b), 1(c) and 1(d).

In adjusting the angular position of the control disc 14 relative to the camshaft 11 from a point of 0 degree (i.e., a fully downwardly deviated or offset position of the second center axis 02) to a point of 180 degrees (i.e., a fully upwardly deviated or offset position of the second center axis 02) on the x-axis of the diagram of FIG. 1(b) in response to a change in running condition of the engine from a low engine speed to a high engine speed in a condition in which the control disc 14 rotates relative to the camshaft 11 in the direction indicated by the arrow shown in FIG. 1(a), an area of such adjusting is divided into two parts, i.e., a left half and a right half part as viewed in FIG. 1(b), wherein the left half part ranges from a point of 0 degree to a point of 90 degrees on the x-axis of the diagram of FIG. 1(b), and the right half part ranges from a point of 90 degrees to a point of 180 degrees on the x-axis of the same diagram. Now, these parts will be described in detail.

First, as shown in FIG. 1(b), in the left half part of the diagram, when the angular position of the control disc 14 is gradually changed relative to the camshaft 11 from a point of 0 degree to a point of 90 degrees, in the side of the intake valve, a timing of valve opening (i.e., valve opening timing) IO is gradually advanced by an angle of $\Delta \theta$ IO, and a timing of valve closure (i.e., valve closure timing) IC is gradually retarded by an angle of $\Delta \theta$ IC which is much smaller than the angle of $\Delta \theta$ IO.

On the other hand, in the same left half part of the diagram, in the side of the exhaust valve, a timing of valve closure (i.e., valve closure timing) EC is gradually retarded by an angle of $\Delta \theta$ EC, and a timing of valve opening (i.e., valve opening timing) EO is gradually advanced by an angle of $\Delta \theta$ EO which is much smaller than the angle of $\Delta \theta$ EC.

Consequently, in the left half part of the diagram of FIG. 1(b), as is clear from FIG. 1(c), the valve opening timing IO of the intake valve is relatively advanced, while the valve closure timing EC of the exhaust valve is retarded, so that the overlap period of the intake and the exhaust valve is increased.

After that, in the right half part of the diagram of FIG. 1(b), when the angular position of the control disc 14 is gradually changed relative to the camshaft 11 from a point of 90 degrees to a point of 180 degrees on the x-axis of the diagram of FIG. 1(b), in the side of the intake valve, the valve opening timing IO is gradually advanced by an angle of $\Delta \theta$ IO', while the valve closure timing IC is gradually retarded by an angle of $\Delta \theta$ IC' which is larger than the angle of $\Delta \theta$ IO' (i.e., $\Delta \theta$ IC'>$\Delta \theta$ IO').

On the other hand, in the same right half part of the diagram of FIG. 1(b), in the side of the exhaust valve, the valve closure timing EC is gradually retarded by an angle of $\Delta \theta$ EC', while the valve opening timing EO is gradually advanced by an angle of $\Delta \theta$ EO' which is much larger than the angle of $\Delta \theta$ EC'.

Consequently, in the right half part of the diagram of FIG. 1(b), as is clear from FIG. 1(d), the valve closure timing IC of the intake valve is relatively retarded, while the valve opening timing EO of the exhaust valve is advanced, so that the overlap period of the intake and the exhaust valve is further increased.

As described above, when the running condition of the engine is changed from a low engine speed to a high engine speed, the angular position of the control disc 14 is changed relative to the camshaft 11 from a point of 0 degree (i.e., a fully downwardly deviated or offset position) to a point of 180 degrees (i.e., a fully upwardly deviated or offset position) on the x-axis of the diagrams shown in FIG. 1(b), so that the duration of valve opening of the intake and the exhaust valve is increased. In this embodiment, since the individual control discs 14 are rotatably driven in the directions indicated by the arrows shown in FIGS. 1(a) and 2, the overlap period of the intake and the exhaust valve is first increased, and then the timing of valve closure of the intake valve is retarded and the timing of valve opening of the exhaust valve is advanced.

By adjusting the angular position of the control disc 14 relative to the camshaft 11 in a manner described above, it is possible to increase a peak value of engine torque in a range of intermediate engine speeds, and also possible to smooth a curve of engine torque characteristics in changing the timing of valve operation.

Since the variable valve timing mechanism of the embodiment of the present invention has the above construction, an internal combustion engine provided with the variable valve timing mechanism of the present invention is capable of adjusting its valve opening characteristics by adjusting the angular position of the control disc 14 relative to the camshaft 11 by means of the eccentric angular position control mechanism 30.

More particularly, in the ECU 34 (shown in FIG. 3), the optimum angular position of the control disc 14 relative to the camshaft 11 is determined on the basis of various pieces of current information as to engine speeds, intake air volumes and the like. Then, the actuator 33 is energized by the ECU 34 to rotatably drive the control disc 14 so as to change its angular position relative to the camshaft 11 from its current (i.e., actual) angular position to its optimum angular position thus determined in the ECU 34, wherein the current angular position of the control disc 14 relative to the camshaft 11 is detected by the use of a detection signal issued from an angular position sensor (not shown).

Under control of the ECU 34, the actuator 33 is energized to rotatably drive the eccentric portion 15 of the control disc 14 relative to the camshaft 11 so as to adjust its angular position relative to the camsahft 11, so that the second center axis 02 of the intermediate rotary member 16 is gradually displaced relative to the camshaft 11, whereby, for example, the more the current engine speed and load increase, the more the curve of valve opening characteristics approaches the solid-line curve VL1 of FIG. 7(c) so as to increase the duration of valve opening. Conversely, the more the current engine speed and load decrease, the more the curve of valve opening characteristics approaches the dotted-line curve VL2 of FIG. 7(c) so as to decrease the duration of valve opening.

As described above, it is possible for the variable valve timing mechanism of the present invention to perform the optimum valve operation in response to the running condition of the engine by adjusting the angular position of the control disc 14 relative to the camshaft 11. Particularly, in the present invention, since the valve lift characteristics are continuously adjusted, it is always possible to operate the engine valve 2 in its optimum mode.

Further, in this case, when the running condition of the engine is changed from a low engine speed to a high engine speed, as a first step the duration of valve opening is changed so as to increase the overlap period of the intake and the exhaust valve. In this connection, in the embodiment of the present invention, the control disc 14 in the side of the intake valve is rotatably driven clockwise relative to the camshaft 11, while the control disc 14 in the side of the exhaust valve is rotatably driven counterclockwise relative to the camshaft 11, as viewed in FIG. 1(a).

More particularly, when the control disc 14 has its angular position changed relative to the camshaft 11 from a point of 0 degree to a point of 90 degrees on the x-axis of the diagram shown in FIG. 1(b), the valve opening timing IO of the intake valve is relatively advanced, while the valve closure timing EC of the exhaust valve is retarded, so that the overlap period of the intake and the exhaust valve increases, as is clear from FIG. 1(c).

After that, in the diagram shown in FIG. 1(b), when the control disc 14 has its angular position further changed relative to the camshaft 11 from a point of 90 degrees to a point of 180 degrees on the x-axis of the diagram, the valve closure timing IC of the intake valve is relatively retarded and the valve opening timing EO of the exhaust valve is advanced, as is clear from FIG. 1(d).

As described above, in the variable valve timing mechanism of the present invention, when the running condition of the engine is changed from a low engine speed to a high engine speed, the angular position of the control disc 14 is changed relative to the camshaft 11 from a point of 0 degree (i.e., a fully downwardly deviated or offset angular position) to a point of 180 degrees (i.e., a fully upwardly deviated or offset angular position) on the x-axis of the diagram of FIG. 1(b), so that: as a first step the overlap period of the intake and the exhaust valve increases; and, then, the valve closure timing of the intake valve is retarded, while the valve opening timing of the exhaust valve is advanced.

By adjusting the angular position of the control disc 14 relative to the camshaft 11 in a manner described above, it is possible to increase a peak value of engine torque in a range of intermediate engine speeds, and also possible to smooth a curve of engine torque characteristics in adjusting the valve timing of the engine. In other words, when the running condition of the engine is changed from a low engine speed to a high engine speed, the overlap period of the intake and the exhaust valve is increased, which eliminates substantially all the stepped portions in the curve of the engine torque characteristics to enable the engine to accomplish a smooth acceleration of its engine speed.

Figure 11A:
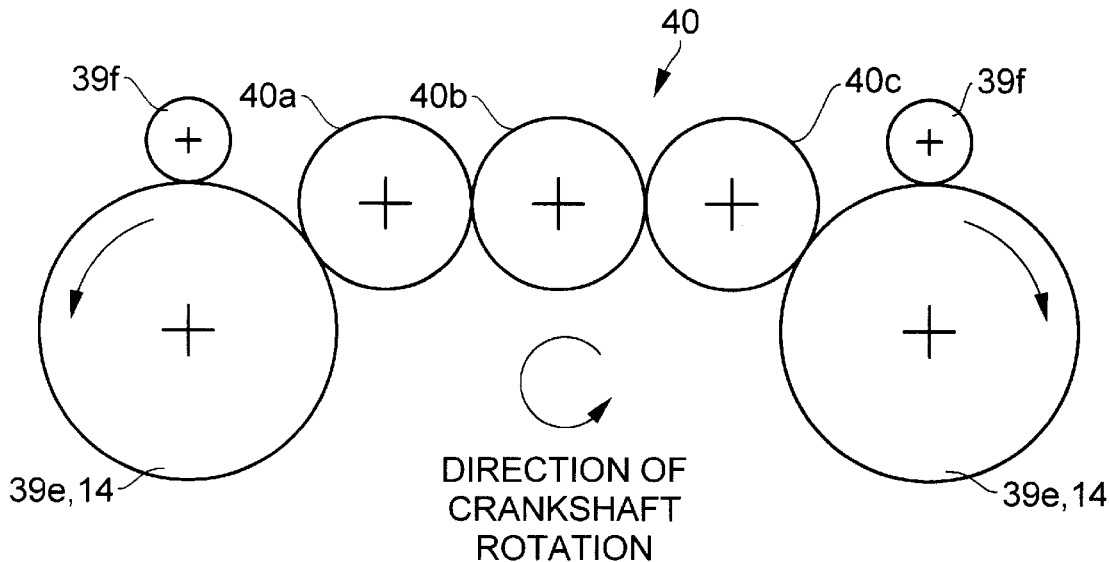
FIGS. 11(a), 11(b), 11(c) and 11(d) are schematic diagrams showing a first modification of the embodiment of the variable valve timing mechanism of the embodiment of the present invention.
Figure 12:
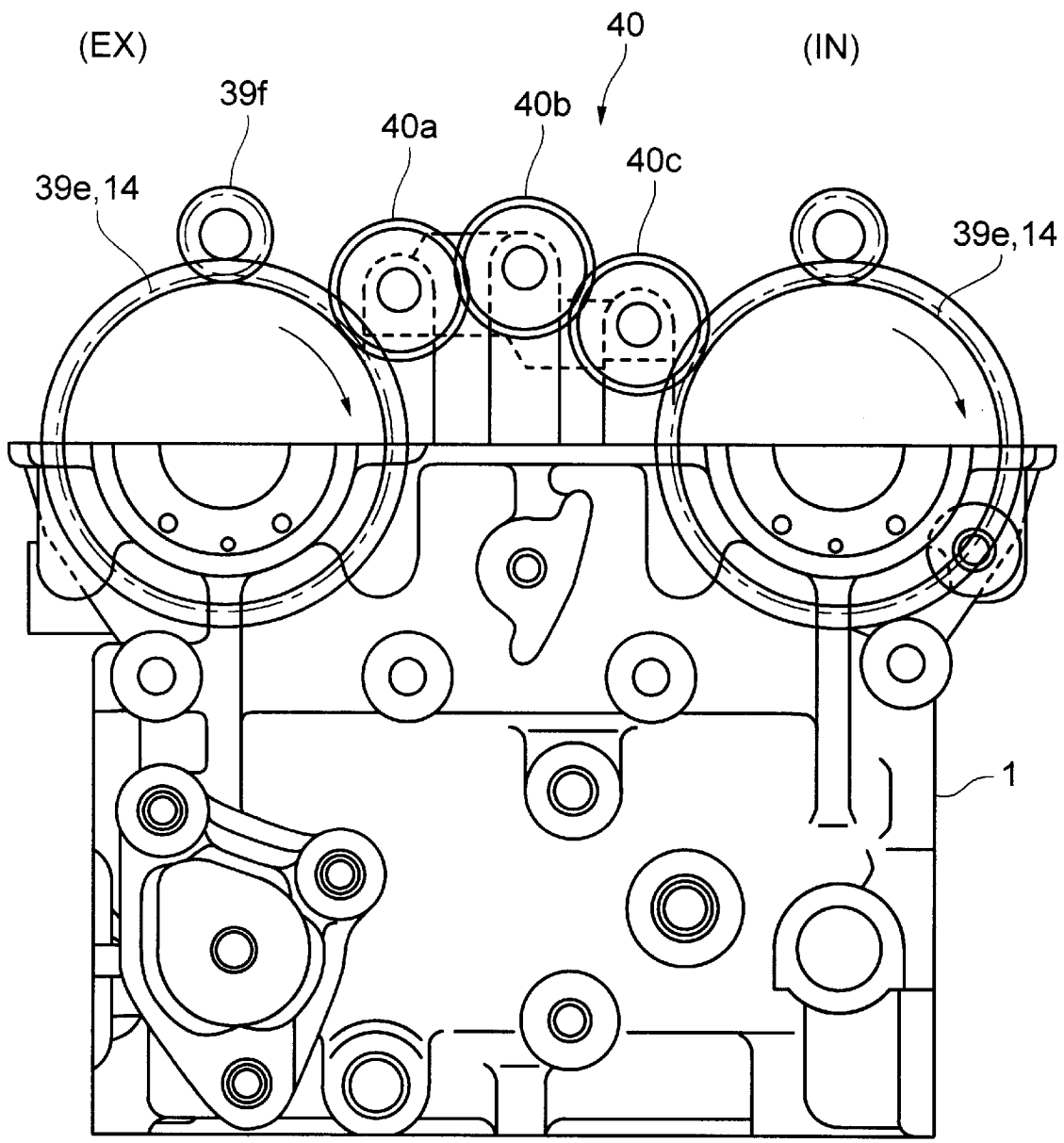
FIG. 12 is a schematic diagram of the modification of the embodiment of the present invention.

Now, a first modification of the embodiment of the present invention will be described. As shown in FIGS. 11(a) and 12, in this first modification, the number of gears used in the intermediate gear mechanism 40 is changed to one of odd numbers, i.e., three. In other words, the gears 40a, 40b and 40c forms the intermediate gear mechanism 40, so that the control disc 14 in the side of the intake valve is rotatably driven in the same direction as that of the control disc 14 in the side of the exhaust valve in adjusting the angular position of the control disc 14 relative to the camshaft 11. Incidentally, in this case, when the running condition of the engine is changed from a low engine speed to a high engine speed, the control discs 14 in both of the sides of the intake and the exhaust valve are rotatably driven clockwise relative to the camshaft 11, as viewed in FIG. 11(a). At this time, the engine (i.e., crankshaft) and the camshaft 11 rotate counterclockwise, as viewed in FIG. 11(a).

Further, in case that the control discs 14 in both of the sides of the intake and the exhaust valve are rotatably driven relative to the camshaft 11 in the same direction, the same curves of valve lift characteristics (which determine whether the timing of valve opening is changed prior to or later than changing of the timing of valve closure) are obtained in the individual sides of the intake and the exhaust valve, wherein the curves of valve lift characteristics are plotted in FIGS. 11(c) and 11(d) to show variation in valve opening timing and valve closure timing of each of the intake and the exhaust valve on the x-axis of each of the diagrams of FIGS. 11(c) and 11(d).

Even when the direction of rotation of each of the control discs 14 is set as described above, as a first step the overlap period of the intake and the exhaust valve is increased by changing the duration of valve opening of each of the intake and the exhaust valve in changing the running condition of the engine from a low engine speed to a high engine speed, In this connection, variation in valve timing in the above case will be described with reference to FIGS. 11(b) and 11(d).

Figure 11B:
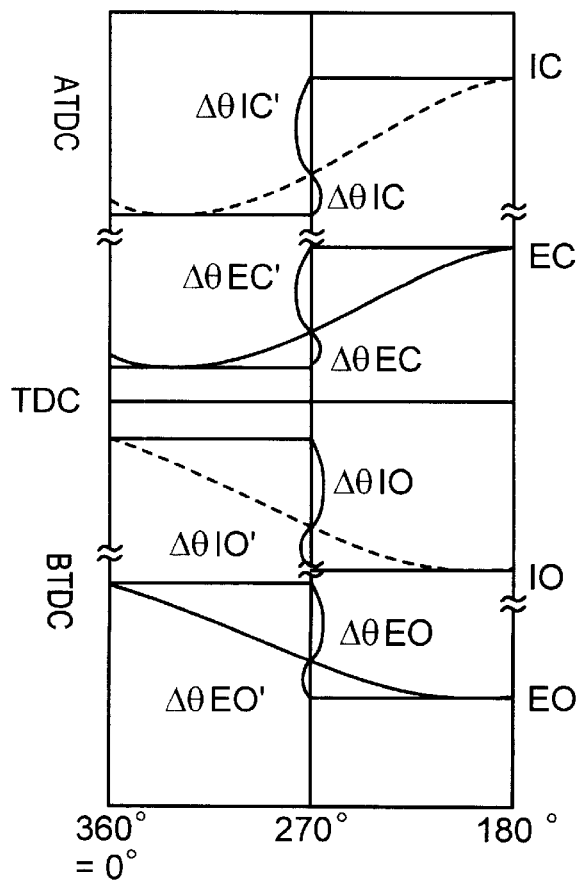

Incidentally, in this modification, since the actuator 33 rotates in a direction counter to that of the actuator 33 used in the embodiment shown in FIG. 3, an initial angular position of the control disc 14 relative to the camshaft 11 is set at a point of 360 degrees on the x-axis of the diagram shown in FIG. 11(b), and then gradually changed relative to the camshaft 11 to a point of 270 degrees, a point of 180 degrees and so on in adjusting the angular position of the control disc 14 relative to the camshaft 11.

More particularly, when the control disc 14 gradually changes its angular position relative to the camshaft 11 from a point of 0 degree (=a point of 360 degrees) to a point of 270 degrees due to its reverse rotation on the x-axis of the diagram of FIG. 11(b), the valve opening timing IO of the intake valve is gradually advanced by an angle of $\Delta \theta$ IO. At this time, the valve closure timing IC of the intake valve is gradually retarded by an angle of $\Delta \theta$ IC which is much smaller than the angle of $\Delta \theta$ IO (i.e., $\Delta \theta$ IC<$\Delta \theta$ IO).

On the other hand, as for the exhaust valve, its valve opening timing EO is gradually advanced by an angle of $\Delta \theta$ EO, while its valve closure timing EC is gradually retarded by an angle of $\Delta \theta$ EC which is much smaller than the angle of $\Delta \theta$ EO.

Figure 11C:
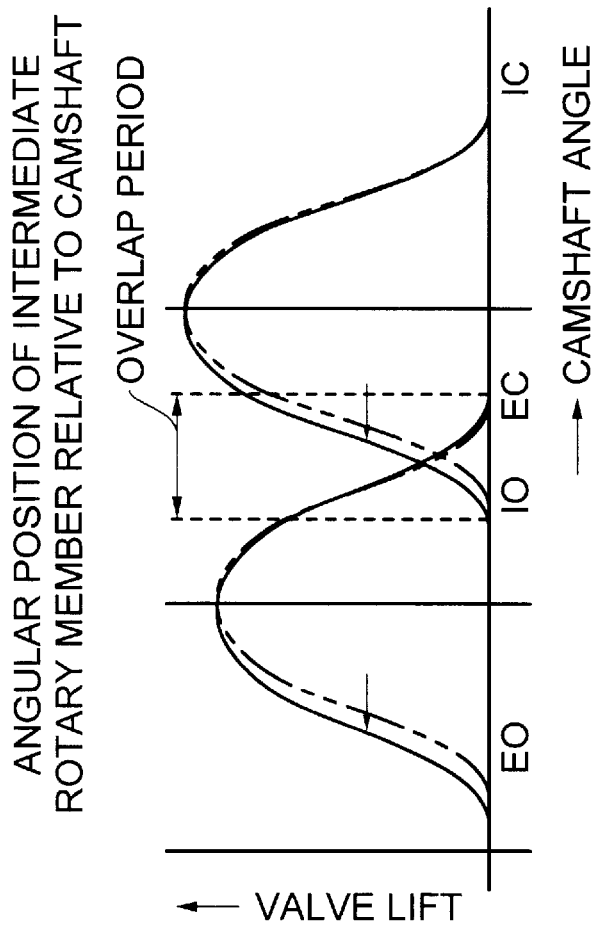

Consequently, in an area between a point of 360 degrees and a point of 270 degrees on the x-axis of the diagram of FIG. 11(b), as shown in FIG. 11(c), both the valve opening timings IO of the intake valve and the valve opening timing EO of the exhaust valve are advanced, so that an overlap period of the intake and the exhaust valve increases by an angle of advanced angle of the valve opening timing IO of the intake valve.

After that, when the control disc 14 gradually changes its angular position relative to the camshaft 11 from a point of 270 degrees to a point of 180 degrees due to its reverse rotation on the x-axis of the diagram of FIG. 11(b), the valve opening timing IO of the intake valve is gradually advanced by an angle of $\Delta \theta$ IO'. At this time, the valve closure timing IC of the intake valve is gradually retarded by an angle of $\Delta \theta$ IC' which is much larger than the angle of $\Delta \theta$ IO' (i.e., $\Delta \theta$ IC'>$\Delta \theta$ IO').

On the other hand, as for the exhaust valve, its valve closure timing EC is gradually retarded by an angle of $\Delta \theta$ EC', while its valve opening timing EO is gradually advanced by an angle of $\Delta \theta$ EO' which is much smaller than the angle of $\Delta \theta$ EC' (i.e., $\Delta \theta$ EC'>$\Delta \theta$ EO').

Figure 11D:
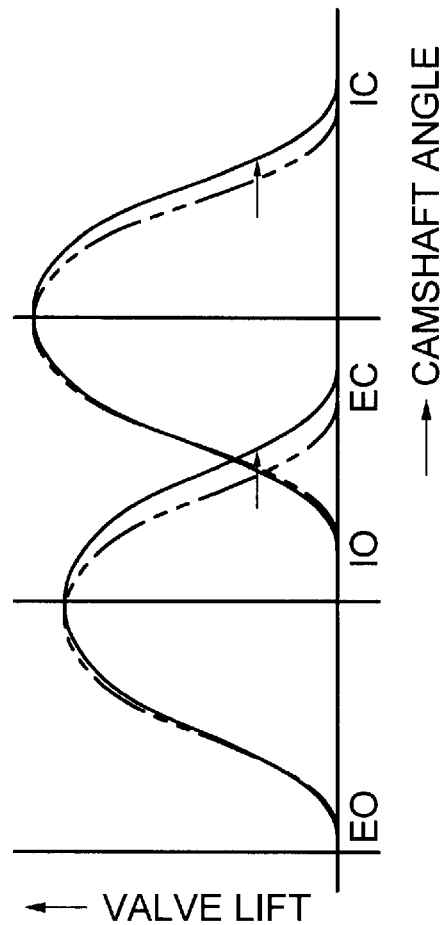

Consequently, in an area between a point of 270 degrees and a point of 180 degrees on the x-axis of the diagram of FIG. 11(b), as shown in FIG. 11(d), both the valve closure timings IC of the intake valve and the valve closure timing EC of the exhaust valve are retarded, so that an overlap period of the intake and the exhaust valve increases by an angle of retarded angle of the valve closure timing EC of the exhaust valve.

As described above, in the first modification, in changing the running condition of the engine from its low engine speed to its high engine speed, when the control disc 14 has its angular position changed relative to the camshaft 11 from a point of 360 degrees to a point of 180 degrees on the x-axis of the diagram of FIG. 11(b), as a first step the valve opening timing of each of the intake and the exhaust valve is advanced, and then the valve closure timing of each of the intake and the exhaust valve is retarded.

Consequently, as a first step the overlap period of the intake and the exhaust valve is increased by an angle of advance of the valve opening timing of the intake valve, and further increased by an angle of retard of the valve closure timing of the exhaust valve, as is clear from the diagrams shown in FIGS. 11(c) and 11(d).

Consequently, in the first modification, by setting a direction of rotation of the control disc 14 relative to the camshaft 11 as described above in adjusting its angular position relative to the camshaft 11, it is possible for the modification to obtain the same effect as that obtained in the embodiment of the present invention. In other words, in changing the running condition of the engine from its low engine speed to its high engine speed, as a first step the overlap period of the intake and the exhaust valve is increased so that a peak value of engine torque increases in a range of intermediate engine speeds, which smooths the curve of engine torque in adjusting the valve timing.

Further, in changing the running condition of the engine from its low engine speed to its high engine speed, as a first step the overlap period of the intake and the exhaust valve is increased so that substantially any of stepped portions in the curve of engine torque is eliminated, whereby a smooth acceleration of the engine speed is realized.

Now, a second modification in the embodiment of the present invention will be described.

In this second modification, when the running condition of the engine is changed from a low engine speed to a high engine speed, the control disc 14 is rotated counterclockwise relative to the camshaft 11 in the side of each of the intake and the exhaust valve for adjusting the angular position of the control disc 14 relative to the camshaft 11, wherein a direction of rotation of the control disc 14 relative to the camshaft 11 is counter to that of the control disc 14 used in the first modification.

Figure 13A:
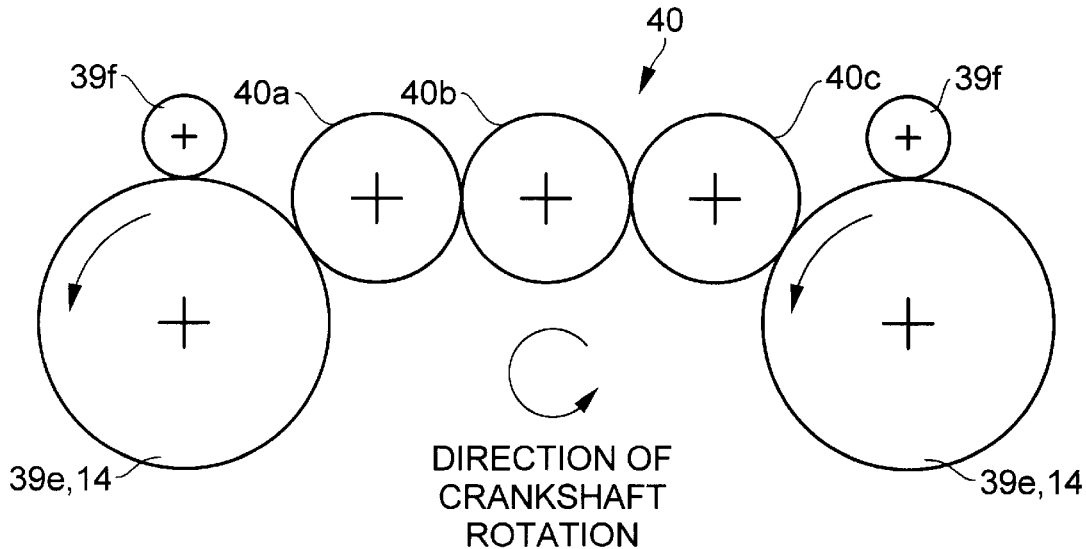
Figure 13B:
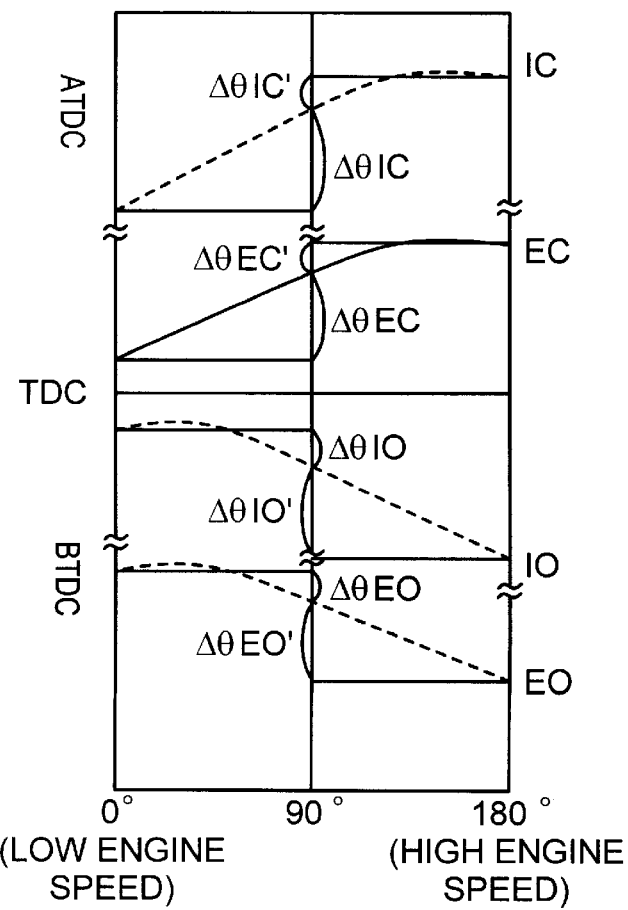

More particularly, as shown in FIG. 13(*a*), in this second modification, the intermediate gear mechanism 40 is constructed of a plurality of gears the number of which is an odd number (i.e., three: gears 40*a*, 40*b* and 40*c*), so that the control discs 14 in both the sides of the intake and the exhaust valve are rotatably driven relative to the corresponding camshafts 11 in the same direction, i.e., counterclockwise, as indicated by the arrows shown in FIG. 13(*a*).

Further, in this second modification, the direction of rotation of each of these control discs 14 relative to the corresponding camshafts 11 in both the sides of the intake and the exhaust valve is counter to the direction of rotation of each of the engine and the camshaft 11.

Consequently, in this case (i.e., second modification), the same valve lift characteristics as those described in the above with reference to FIGS. 10(*a*) to 10(*e*) are obtained. More particularly, when the running condition of the engine is changed from a low engine speed to a high engine speed, the control discs 14 in both the sides of the intake and the exhaust valve are driven relative to the corresponding camshafts 11 in the direction indicated by a pair of the arrows shown in FIG. 13(*a*), so that: as a first step both the valve closure timings of the intake and the exhaust valve are retarded; and, then both the valve opening timings of the intake and the exhaust valve are advanced.

In other words, when the control disc 14 has its angular position changed relative to the camshaft 11 from a point of 0 degree to a point of 90 degrees on the x-axis of the diagram shown in FIG. 13(*b*), as is clear from FIG. 13(*c*), the valve closure timing IC of the intake valve is retarded by an angle of $\Delta \theta$ IC, while the valve opening timing IO is advanced by an angle of $\Delta \theta$ IO which is much smaller than the angle of $\Delta \theta$ IC.

On the other hand, at this time, in the exhaust valve, its valve closure timing EC is retarded by an angle of $\Delta \theta$ EC, while its valve opening timing EO is advanced by an angle of $\Delta \theta$ EO which is much smaller than the angle of $\Delta \theta$ EC.

Consequently, in an area between a point of 0 degree to a point of 90 degrees on the x-axis of the diagram of FIG. 13(*b*), as is clear from FIG. 13(*c*), the valve closure timing IC of the intake valve and the valve closure timing EC of the exhaust valve are relatively retarded, so that the overlap period of the intake and the exhaust valve is increased by an angle of retard of the valve closure timing of the exhaust valve on the x-axis of the diagram of FIG. 13(*b*).

After that, when the angular position of the control disc 14 is changed relative to the camshaft 11 from a point of 90 degrees to a point of 180 degrees on the x-axis of the diagram of FIG. 13(*b*), in the intake valve, its valve opening timing IO is advanced by an angle of $\Delta \theta$ IO', while its valve closure timing IC is retarded by an angle of $\Delta \theta$ IC' which is smaller than the angle of $\Delta \theta$ IO' (i.e., $\Delta \theta$ IO'>$\Delta \theta$ IC').

At the same time, in the exhaust valve, its valve closure timing EC is retarded by an angle of $\Delta \theta$ EC', while its valve opening timing EO is advanced by an angle of $\Delta \theta$ EO' which is larger than the angle of $\Delta \theta$ EC' (i.e., $\Delta \theta$ EO'>$\Delta \theta$ EC').

Consequently, in an area between a point of 90 degrees and a point of 180 degrees on the x-axis of the diagram of FIG. 13(*b*), as is clear from FIG. 13(*d*), the valve opening timing IO of the intake valve and the valve opening timing EO of the exhaust valve are relatively advanced.

Incidentally, the overlap period of the intake and the exhaust valve is first increased by an angle of retard of the valve closure timing EC of the exhaust valve in the diagram shown in FIG. 13(*c*), and then further increased by an angle of advance of the valve opening timing IO of the intake valve in the diagram shown in FIG. 13(*d*).

Consequently, the same effect as that obtained in the first modification is obtained also in this second modification. In other words, when the running condition of the engine is changed from a low engine speed to a high engine speed, since the overlap period of the intake and the exhaust valve is first increased, it is possible to increase a peak value of engine torque in a range of intermediate engine speeds, and also possible to smooth the curve of engine torque in changing the valve timing of the engine.

Further, in changing the running condition of the engine from its low engine speed to its high engine speed, it is possible to eliminate all the stpped portions of the curve of engine torque, so that a smooth acceleration in engine speed is realized in the engine provided with the variable valve timing mechanism of the present invention.

Incidentally, the variable valve timing mechanism of the present invention is not limited only to its embodiment and modifications described above. It should be understood that those skilled in the art could accomplish any other embodiments and modifications within the scope of the present invention. For example, the present invention is applicable to a valve operating mechanism using a conventional non-constant velocity joint. Further, the way, in which the eccentric portion 15 of the control disc 14 in the side of each of the intake and the exhaust valve is adjusted in its angular position relative to the camshaft 11, is not limited to those described in the above embodiment and modifications of the present invention. Still further, the variable valve timing mechanism of the present invention is not necessarily provided in the side of each of the intake and the exhaust valve. In other words, as is in the embodiment of the present invention, it suffices to provide the variable valve timing mechanism of the present invention in the side of at least one of the intake and the exhaust valve, provided that the overlap period of the intake and the exhaust valve is first increased in changing the running condition of the engine from its low engine speed to its high engine speed.

What is claimed is:

1. A variable valve timing mechanism for varying the duration of opening of at least one of intake and exhaust valves of an internal combustion engine, comprising:

a camshaft to which given torque is to be transmitted from a crankshaft of the internal combustion engine;

a cam lobe relatively rotatably mounted on said camshaft and having a cam portion for driving at least one of the intake and exhaust valves of the internal combustion engine;

an intermediate rotary member disposed between said camshaft and said cam lobe for transmitting rotation of said camshaft to said cam lobe; and a control mechanism for changing an eccentric angular position of said intermediate rotary member in response to running condition of the internal combustion engine to thereby vary the duration of opening of at least one of the intake and exhaust valves;

said variable valve timing mechanism being provided for at least one of the intake valve and the exhaust valve;

said control mechanism being operable to vary the duration of opening of at least one of the intake and exhaust valves in such a manner that, when the current running condition of the internal combustion engine shifts from a low engine speed to a high engine speed, the duration of opening of the intake valve is initially changed more greatly by an angle of advance of the intake valve opening timing than by an angle of retard of the intake valve closure timing or the duration of opening of the exhaust valve is initially changed more greatly by the angle of retard of the exhaust valve closure timing than by the angle of advance of the exhaust valve opening timing.

2. A variable valve timing mechanism according to claim 1, wherein said variable valve timing mechanism is provided for both the intake and exhaust valves of the internal combustion engine, and said control mechanism is operable to control the duration of opening of the intake and exhaust valves in timed relation with each other in response to the current running condition of the internal combustion engine in such a manner that the valve opening timing of the intake valve is initially changed more greatly by the angle of advance of the intake valve opening timing than by the angle of retard of the intake valve closure timing while the valve closure timing of the exhaust valve is initially changed more greatly by the angle of retard of the exhaust valve closure timing than by the angle of advance of the exhaust valve opening timing, and subsequently the valve closure timing of the intake valve is retarded while the valve opening timing of the exhaust valve is advanced.

\* \* \* \* \*